(12) United States Patent
Mayster

(10) Patent No.: US 7,134,457 B2
(45) Date of Patent: Nov. 14, 2006

(54) METHOD OF WEAVING BRAILLE AND WOVEN BRAILLE TEXTILE

(75) Inventor: Jennifer J. Mayster, Chevy Chase, MD (US)

(73) Assignee: Blind Faith School of Music and Art, Chevy Chase, MD (US)

( * ) Notice: Subject to any disclaimer, the term of this patent is extended or adjusted under 35 U.S.C. 154(b) by 0 days.

(21) Appl. No.: 11/073,162

(22) Filed: Mar. 4, 2005

(65) Prior Publication Data

US 2006/0196569 A1 Sep. 7, 2006

(51) Int. Cl.
 *D03D 41/00* (2006.01)
 *B41J 3/32* (2006.01)
 *D03D 29/00* (2006.01)

(52) U.S. Cl. .................... 139/11; 139/29; 139/33; 400/109.1; 400/483; 434/113; 434/114; 434/115

(58) Field of Classification Search .................. 139/11, 139/29, 33; 400/109.1, 483; 434/113–115
See application file for complete search history.

(56) References Cited

U.S. PATENT DOCUMENTS

| | | | | |
|---|---|---|---|---|
| 1,822,938 A | * | 9/1931 | Smith ...................... 400/109.1 |
| 2,167,193 A | * | 7/1939 | Wessborg et al. ............. 139/33 |
| 3,998,246 A | * | 12/1976 | Strousser .................... 139/1 R |
| 4,194,190 A | * | 3/1980 | Bareau ..................... 340/407.2 |
| 4,277,239 A | * | 7/1981 | Genis ......................... 434/115 |
| 4,473,356 A | * | 9/1984 | Fernando et al. ........... 434/114 |
| 4,519,781 A | * | 5/1985 | Boyd .......................... 434/156 |
| 4,551,102 A | * | 11/1985 | Meinzer ...................... 434/114 |
| 4,608,939 A | * | 9/1986 | Lampley ..................... 112/260 |
| 5,108,290 A | * | 4/1992 | Eriksson ..................... 434/114 |
| 5,113,612 A | * | 5/1992 | Machen ........................ 40/336 |
| 5,346,571 A | * | 9/1994 | Condon et al. ............. 156/212 |
| 5,574,830 A | * | 11/1996 | Quzilleau ................... 358/1.3 |
| 5,650,217 A | * | 7/1997 | Skrivanek et al. ........ 428/195.1 |
| 5,839,215 A | * | 11/1998 | Lasprogata .............. 40/299.01 |
| 6,271,453 B1 | * | 8/2001 | Hacker ........................ 84/476 |
| 6,320,496 B1 | * | 11/2001 | Sokoler et al. ........... 340/407.1 |
| 6,340,957 B1 | * | 1/2002 | Adler et al. ................. 345/1.3 |
| 6,398,435 B1 | * | 6/2002 | Kozakai et al. .......... 400/144.2 |
| 6,402,403 B1 | * | 6/2002 | Speakman ............. 400/120.03 |
| 6,419,497 B1 | * | 7/2002 | Carlson ...................... 434/367 |
| 6,481,134 B1 | * | 11/2002 | Aledo ...................... 40/661.09 |
| 6,881,063 B1 | * | 4/2005 | Yang .......................... 434/114 |
| 6,930,590 B1 | * | 8/2005 | Ling et al. ............... 340/407.1 |
| 6,949,290 B1 | * | 9/2005 | Schaeffeler et al. ...... 428/411.1 |
| 7,021,340 B1 | | 4/2006 | Mayster |

OTHER PUBLICATIONS

Mayster, Jennifer J., Declaration.

* cited by examiner

*Primary Examiner*—John J. Calvert
*Assistant Examiner*—Robert H Muromoto, Jr.
(74) *Attorney, Agent, or Firm*—Finnegan, Henderson, Farabow, Garrett & Dunner, LLP

(57) ABSTRACT

A method of weaving Braille and/or the resulting woven Braille textile may assist sighted persons in determining the woven Braille cells by differentiating the colors of each number 1 through number 6 Braille cell warp thread. A method of weaving Braille and/or the resulting woven Braille textile may assist blind and visually impaired persons in determining the woven Braille cells or determining the reading content weft threads from filler weft threads by differentiating the texture of the non-Braille cell warp threads from the texture(s) of the Braille cell warp threads.

17 Claims, 28 Drawing Sheets
(20 of 28 Drawing Sheet(s) Filed in Color)

Fig. 2

| # | 0 | 1 | 2 | 3 |
|---|---|---|---|---|
| 1  · • 4 | ·  • | •  · | •  · | •  • |
| 2  · • 5 | •  • | ·  · | •  · | ·  · |
| 3  • • 6 | ·  · | ·  · | ·  · | ·  · |

| 4 | 5 | 6 | 7 | 8 |
|---|---|---|---|---|
| •  • | •  · | •  • | •  • | •  · |
| ·  • | ·  • | •  · | •  • | •  • |
| ·  · | ·  · | ·  · | ·  · | ·  · |

| 9 |
|---|
| ·  • |
| •  · |
| ·  · |

Fig. 3

The Braille cell
arranged by color

METHOD OF WEAVING BRAILLE AND WOVEN BRAILLE TEXTILE

BACKGROUND

Technical Field

Embodiments disclosed herein relate to a method of weaving with selected colored and textured warp and weft materials and the resulting woven textile.

Weaving is accomplished by passing a crosswise thread in a predetermined perpendicular pattern under and over lengthwise threads. Looms increase the efficiency of weaving by providing a loom frame that supports a plurality of lengthwise threads (called warp threads). The warp threads are threaded through loops (called heddles) made of wire or string, which may be attached between top and bottom rods or bar members of a harness. When the harness is raised or lowered, it accordingly raises or lowers the attached heddles the same distance, which pull the warp threads threaded through the heddles apart from the other warp threads, creating a sometimes triangular-cross-sectioned space (called a shed) through which to pass the crosswise thread (called the weft). This eliminates the need to move the weft up and over and down and under warp threads. Instead, the weft thread is wound on a shuttle, and the shuttle is passed from one hand to the other through the shed created by the separated warp threads. A good reference book of weaving, the entire disclosure of which is hereby incorporated by reference, is Warp and Weave by Robert LeClerc available from LeClerc Looms of Canada.

While the word thread is used throughout for convenience, it should be understood that "thread" may encompass any material that can be woven. For instance, natural fibers, synthetic fibers, filaments, yarns, reeds, paper, leather, and ribbons have all been woven. Typically for a material to be woven, a material must have a length much greater than its width.

At least two harnesses are needed to weave: one to move a set of warp threads, the other to move the remaining set of warp threads. However, most looms have at least four harnesses. Commonly, the number of harnesses available on looms increases in multiples of four.

Each harness is attached to an actuator. It is the actuator that the loom operator moves in order to raise or lower the attached harnesses, thereby separating the selected set of warp threads from the remaining warp threads. In weaving vernacular, if the actuator is moved with a hand, it is referred to as a "lever." If it is moved with a foot, it is referred to as a treadle. A thin, flexible and strong member, such as cording, is often used to tie an actuator to one or more harnesses. Looms that may be used on a table are referred to as table-top looms and most often have top or side levers. Floor looms, so named because they are set up on the floor, most often have treadles that are connected to the harnesses near the floor below the warp.

LeClerc Looms makes a portable, table-top loom called the Voyager. It is sold With four or eight harnesses. Each harness is referred to as a "shaft," and thus the Voyager is offered in both a four and eight "shaft" model. An eight "shaft" model is illustrated in FIG. 1. A loom frame 20 may include a top board 22 with eight levers 24–38. Each lever is rotatable about a bar from the back of top board 22 to the front of top board 22 and is securable by magnetic forces operating between the magnets 40*a* and 40*b*: one magnet 40*a* in the lever and one magnet 40*b* directly below it in the top board 10. Each lever is tied to a harness 42–56. Each harness has heddles through which the warp threads 58 are threaded. By rotating a lever, the harness 42–56 to which it is attached is raised, pulling the desired warp threads apart from the remainder of the warp threads. A shuttle 60 may then be passed from one side to the other through a shed (not shown) formed by the separated warp threads (not shown). A "beater" bar 61 may then be rotated toward the woven textile, bringing the newly woven weft thread into contact with the previously woven weft threads. LeClerc and other loom making companies, such as, for example, Schacht, Louet, and Ashford, all sell four- or eight-"shaft" (or even twelve), table-top looms with levers on top or on the side.

Braille, a system of six raised dots invented by Louis Braille, enabled one to read words and mathematics or music symbols though the fingertips rather than the eyes. FIG. 2 illustrates the alphabet in Braille. FIG. 3 illustrates the numbers 0–9 in Braille. Words do not always have to be Brailled letter for letter. Many words have contracted or short-form representations in Braille. An excellent reference of commonly used Braille representations of words is *The Braille Enthusiast's Dictionary* by Alan J. Koenig and M. Cay Holbrook, which is incorporated herein by reference. Braille may be quickly and consistently created on paper through an invention of David Abraham, a wood-working teacher at the Perkins School for the Blind. He invented a Braille typewriter in 1951, called the Perkins Brailler. As illustrated in FIG. 4, the Perkins Brailler is configured with six keys and a spacer bar: three keys to the left of the spacer bar and three keys to the right of the spacer bar. FIG. 4 is a top-left side perspective view of a Perkins Brailler. The three keys to the left of the spacer bar make the raised dots in positions three, two, and one, (from left to right), respectively. The three keys to the right of the spacer bar make the raised dots in positions four, five, and six (from left to right), respectively. Each of the six keys is just under ¾ inch wide, and the spacer bar is 1¾ inches wide. The keys are 1 inch apart between centerlines, and the centerlines of keys #1 and #4 are 1½ inch from the centerline of the spacer bar.

As described in copending U.S. application Ser. No. 10/895,876, the entire disclosure of which is hereby incorporated herein by reference, Braille may be woven into cloth on a loom. One embodiment of a loom described in the above-identified application has seven levers that simulate the arrangement of keys and spacer bar on a Perkins Brailler, a typewriter for Braille. FIG. 5 illustrates that embodiment. Loom 15, as depicted in FIG. 5, is a modified Voyager-style, table-top loom manufactured by LeClerc Looms of Canada. Loom 15 has seven harnesses. Each harness is tied to a separate one of the seven top levers, which are best illustrated in FIG. 6.

Referring to FIG. 6, the seven levers are in a row with a center lever 64, the center lever 64 having a width greater than any other one of the seven levers (levers 24, 26, 28, 34, 36, and 38). Levers 24, 26, 28, 34, 36, and 38 are ½ inch wide, and the center lever 64, is ⅝ inch wide. Levers 24, 26, and 28 are disposed in a first group on one side of center lever 64 and levers 34, 36, and 38 are disposed in a second group on the other side of center lever 64. Levers 24, 26, 28 in one group and levers 34, 36, and 38 in the second group are each on a one inch lengthwise centerline spacing from the next ½ inch lever, and levers 28 and 34 each have 1¼ inch between their lengthwise centerlines and the lengthwise centerline of the center lever 64.

As shown in FIG. 6, seven levers are positioned in the following order: three (lever 24), two (lever 26), one (lever 28), seven (lever 64), four (lever 34), five (lever 36), six (lever 38). This matches the arrangement of the six keys and spacer bar of a Perkins Brailler: lever 24 corresponds to the number three key of a Perkins Brailler, which produces the bottom left raised dot in a Braille cell, or in other words, dot #3; lever 26 corresponds to the number two key of a Perkins Brailler, which produces the middle left raised dot in a Braille cell, or in other words, dot #2; lever 28 corresponds to the number one key of a Perkins Brailler, which produces the top left raised dot in a Braille cell, or in other words, dot #1; lever 64 corresponds to the spacer bar of a Perkins Brailler, which advances the paper the width of a Braille cell; lever 34 corresponds to the number four key of a Perkins Brailler, which produces the top right raised dot in a Braille cell, or in other words, dot #4; lever 36 corresponds to the number five key of a Perkins Brailler, which produces the middle right raised dot of a Braille cell, or in other words, dot #5; and lever 38 corresponds to the number six key of a Perkins Brailler, which produces the bottom right raised dot in a Braille cell, or in other words, dot #6.

Each one of the seven levers is attached to a separate one of the seven harnesses. The seven harnesses, as illustrated in FIG. 7, are disposed in vertical planes, one behind one another. The loom 15 may be set up with lever 28 connected to harness 66 closest to the front of the loom. Lever 26 may be connected to harness 68 second closest to the front of the loom. Lever 24 may be connected to harness 70 third closest to the front of the loom. Lever 64 may be connected to harness 78 closest to the back of the loom. Lever 64 may be connected to harness 78 seventh closest to the front of the loom. Lever 34 may be connected to harness 72 fourth closest to the front of the loom. Lever 36 may be connected to harness 74 fifth closest to the front of the loom. Lever 38 may be connected to harness 76 sixth closest to the front of the loom.

In loom 15, each of the seven harnesses is attached to at least one heddle, through which at least one piece of thread may be threaded. FIG. 7 illustrates four heddles attached to harness 66. Optionally, a weaver may choose to install more heddles on a harness than the weaver plans to thread for ease of resuming weaving if a heddle should break during a weaving. The number and location of heddles on each harness will vary according to the desired warp thread stringing pattern.

Sighted people appreciate woven textiles not only for the functional aspects of cloth, but also for the visual patterns constructed with stringing and weaving patterns and the particular selected textured, sized, and colored warp and weft threads in those stringing patterns and weaving patterns. Woven Braille provides the additional interest of encoded messages, whether in words, numbers, or musical notes. A weaver can change the rate at which sighted people can determine these encoded messages in the finished woven textile by varying the contrast in the textures, sizes, and colors of the warp and weft threads, as well as varying the contrast in the patterns woven before and after a "Braille" cell. The use of different textures and sizes of warp and weft threads can change the rate at which blind or visually impaired people can determine the encoded messages as well. A woven textile with very little contrast is illustrated in FIG. 8, where all weft and warp threads are the same texture, size, and color, and only the woven pattern changes. Such a weaving requires more time for a sighted person to visually "read" the encoded message than the weaving depicted in, for example, FIG. 23.

To increase support and interest in Braille among sighted people and to provide easier detection of the woven Braille by blind or visually impaired people, a higher contrast woven Braille is needed.

SUMMARY

As embodied and broadly described herein, an embodiment consistent with an aspect of the invention is a method of stringing a loom having at least six actuators. The at least six actuators include a number 1, number 2, number 3, number 4, number 5, and number 6 Braille cell actuator ordered to match the order of the six keys of a Perkins Brailler that create the raised dots of a Braille cell. Each of the at least six actuators is connected to a separate harness, and each harness is connected to at least one heddle. The stringing method comprises threading at least a first thread through the at least one heddle connected to the number 1 Braille cell actuator, thereby creating a first number 1 Braille cell warp thread, threading at least a second warp thread through the at least one heddle connected to the number 2 Braille cell actuator, thereby creating a first number 2 Braille cell warp thread, threading at least a third thread through the at least one heddle connected to the number 3 Braille cell actuator, thereby creating a first number 3 Braille cell warp thread, threading at least a fourth thread through the at least one heddle connected to the number 4 Braille cell actuator, thereby creating a first number 4 Braille cell warp thread, threading at least a fifth thread through the at least one heddle connected to the number 5 Braille cell actuator, thereby creating a first number 5 Braille cell warp thread, and threading at least a sixth thread through the at least one heddle connected to the number 6 Braille cell actuator, thereby creating a first number 6 Braille cell warp thread. Each of the first number 1 through number 6 Braille cell warp threads has a different color.

Another aspect of the invention is a method of weaving Braille on a loom having at least six actuators. The at least six actuators include a number 1, number 2, number 3, number 4, number 5, and number 6 Braille cell actuator. Each of the at least six actuators is connected to a separate harness, and each harness is connected to at least one heddle, whereby when an actuator is moved, the at least one heddle moves apart from the heddles connected to the actuators that are not moved. The weaving method includes stringing the loom. To string the loom includes threading at least a first thread through the at least one heddle connected to the number 1 Braille cell actuator, thereby creating a first number 1 Braille cell warp thread, threading at least a second warp thread through the at least one heddle connected to the number 2 Braille cell actuator, thereby creating a first number 2 Braille cell warp thread, threading at least a third thread through the at least one heddle connected to the number 3 Braille cell actuator, thereby creating a first number 3 Braille cell warp thread, threading at least a fourth thread through the at least one heddle connected to the number 4 Braille cell actuator, thereby creating a first number 4 Braille cell warp thread, threading at least a fifth thread through the at least one heddle connected to the number 5 Braille cell actuator, thereby creating a first number 5 Braille cell warp thread, and threading at least a sixth thread through the at least one heddle connected to the number 6 Braille cell actuator, thereby creating a first number 6 Braille cell warp thread. Each of the first number 1 through number 6 Braille cell warp threads is a different color. The weaving method also includes weaving at least one selected Braille cell having raised dots. The Braille cell weaving step includes moving the one or more of the number 1 through number 6 Braille cell actuators, which correspond to the raised dots of the selected Braille cell, thereby creating a shed between the warp threads that are connected to the one or more moved Braille cell actuators and the remainder of the warp threads on the loom, and passing a reading content weft thread through the shed.

Yet another aspect of the invention is a woven textile comprising a first warp thread having a color, size, and texture, a second warp thread having a different color than the first warp thread, a third warp thread having a different color than the first or second warp thread, a fourth warp thread having a different color than the first, second, or third warp thread, a fifth warp thread having a different color than the first, second, third, or fourth warp thread, and a sixth warp thread having a different color than the first, second, third, fourth, or fifth warp thread. The woven textile also includes a reading content weft thread woven under a first subset of the first through sixth warp threads. The first through sixth warp threads represent the first through sixth possible raised dots in a Braille cells, respectively and the first subset of first through sixth warp threads represents a known Braille cell.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention. The patent or application file contains at least one drawing executed in color. Copies of this patent or patent application publication with color drawings will be provided by the Office upon request and payment of the necessary fee. In the drawings.

Figure 2:
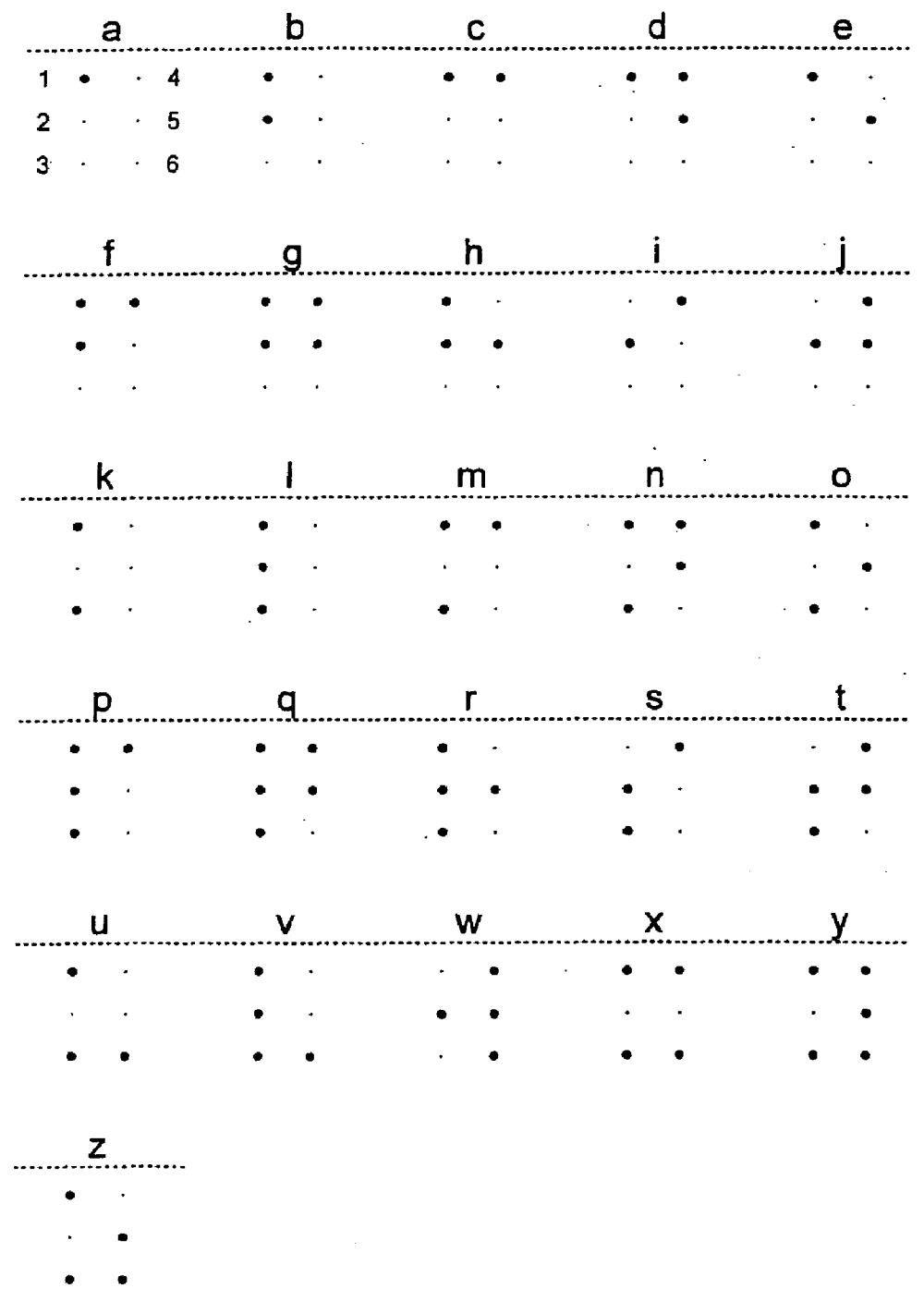

FIG. 2 illustrates the Braille cells for the English alphabet;

Figure 3:
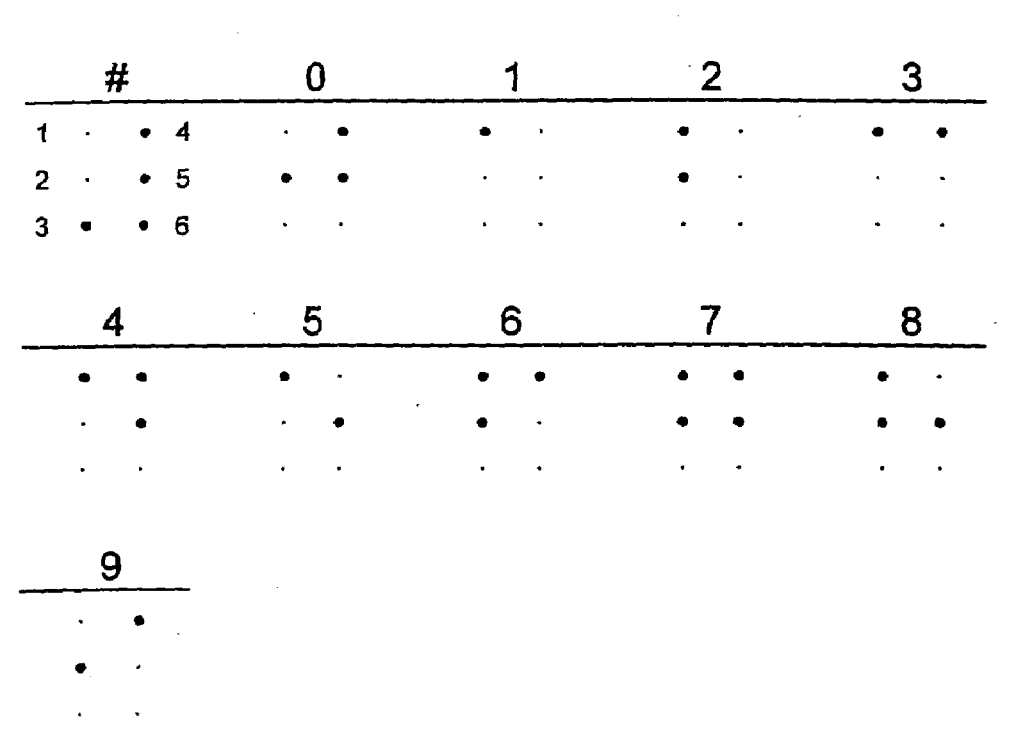

FIG. 3 illustrates the Braille cells for numbers;

DESCRIPTION OF EMBODIMENTS

Reference will now be made in detail to exemplary embodiments consistent with the invention, examples of which are illustrated in the accompanying drawings. Wherever possible, the same reference numbers will be used throughout the drawings to refer to the same or like parts.

Figure 1:
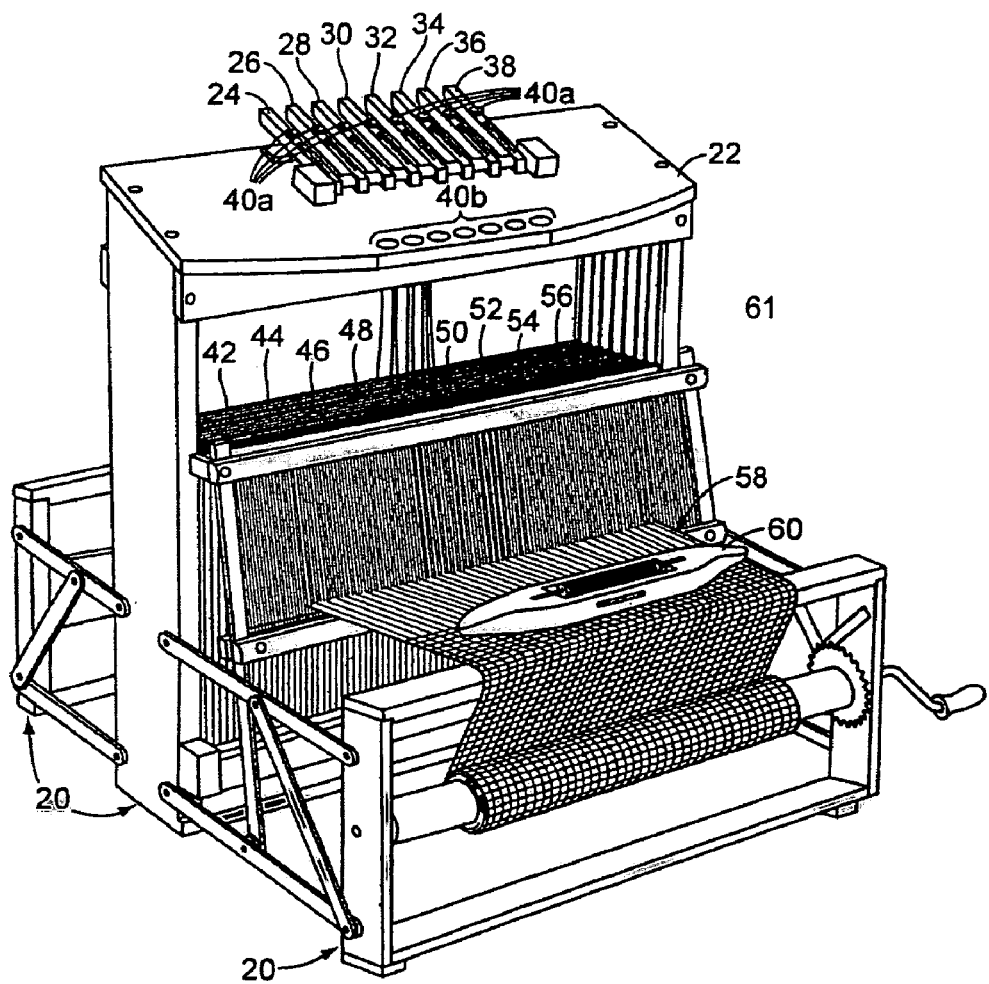
FIG. 1 illustrates a LeClerc, "Voyager" 8 shaft, table-top loom on which embodiments consistent with the invention may be practiced or made.
Figure 4:
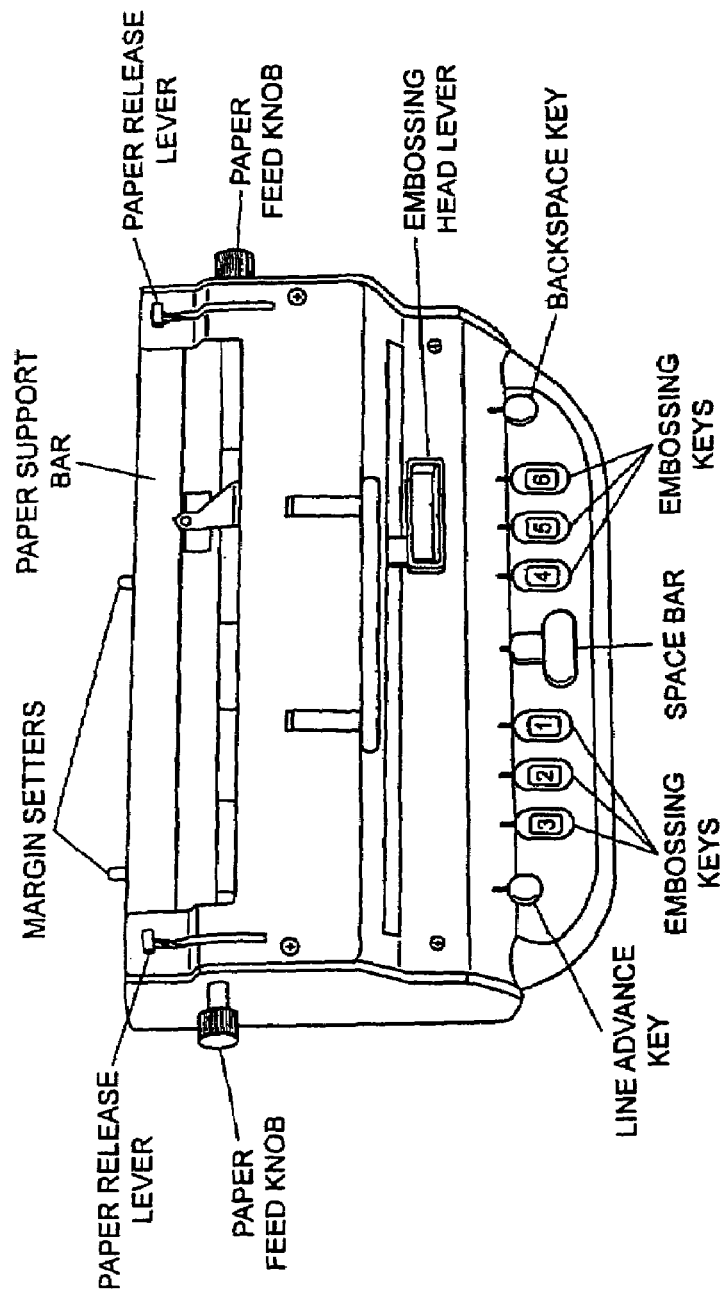
FIG. 4 is a top-side view of a Perkins Brailler.
Figure 5:
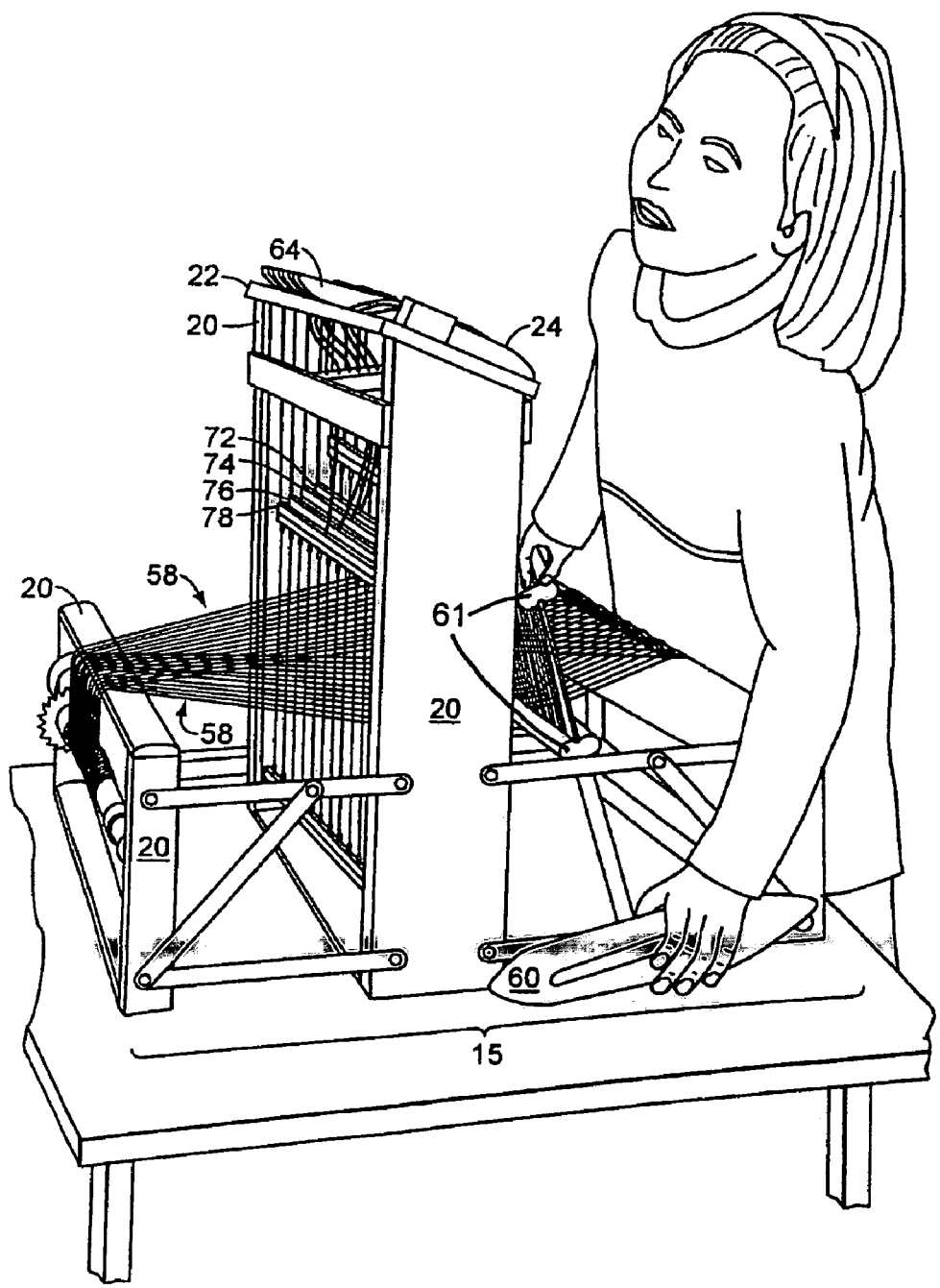
FIG. 5 depicts a loom with seven levers like Perkins Brailler keys and spacer bar on which certain embodiments consistent with the invention may be practiced or made.
Figure 6:
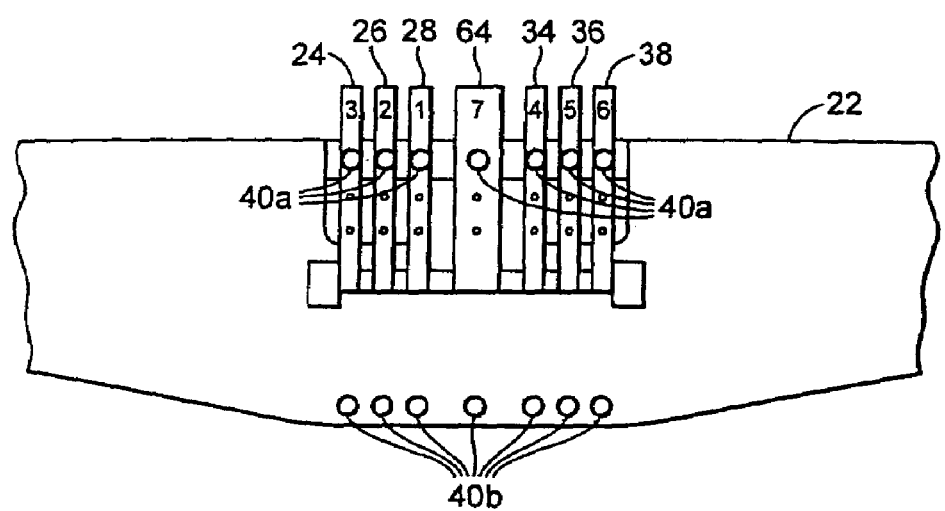
FIG. 6 is an enlarged view of the seven levers of the loom of FIG. 5.
Figure 7:
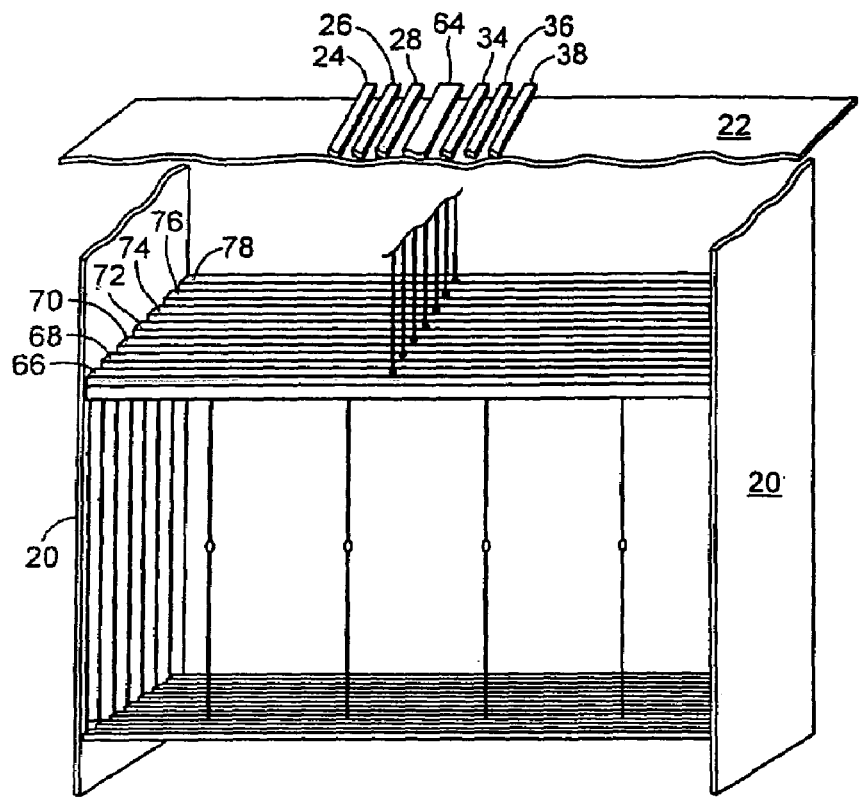
FIG. 7 is a partial front perspective view of the loom of FIG. 5 with heddles only on one harness.
Figure 8:
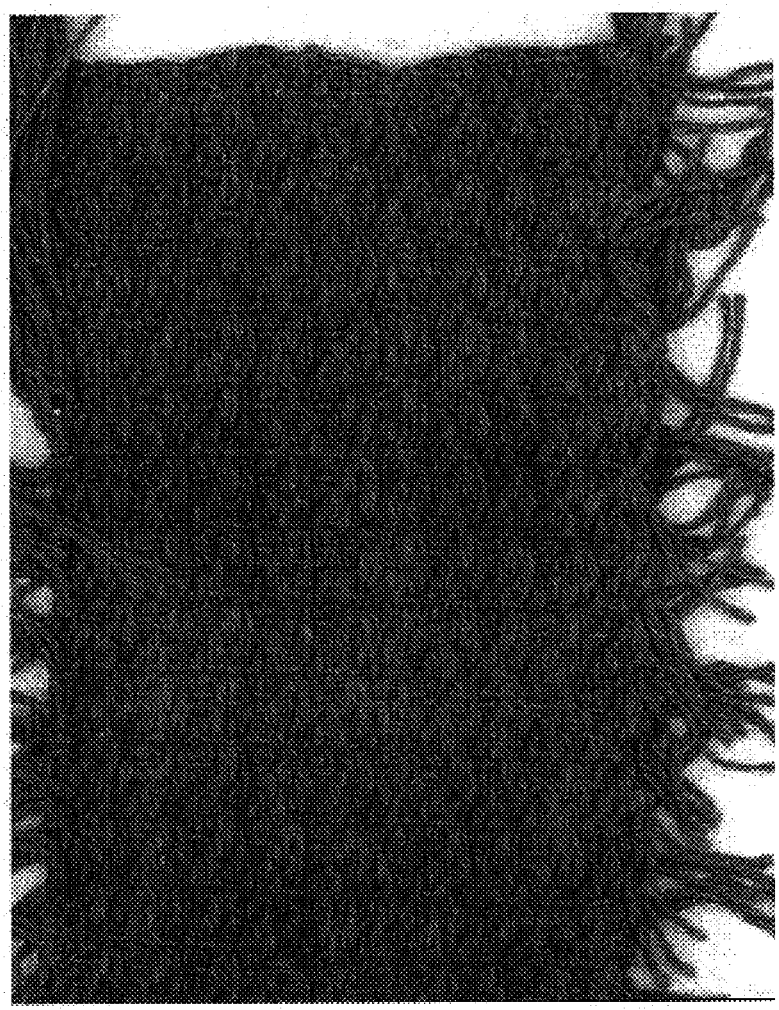
FIG. 8 is a photo of a woven textile made by weaving the Braille alphabet 4 times on a loom of FIG. 5 with the same blue yarn for both the warp and weft thread.

Any loom with at least six actuators may be used to practice or make all aspects of the invention. For example, the looms of FIG. 1 or 5 could be used. Any six of the actuators could be identified and used as the "Braille cell" actuators, whether in number 3, number 2, number 1, number 4, number 5, number 6, order or other order. For those weavers who are weaving to practice Braille as typed on a Perkins Brailler, a loom with only seven actuators, arranged and connected to harness as described in relation to FIGS. 5–7 may be used. With regard to the seven actuator loom illustrated in FIGS. 5–7, other connection orders between actuators and harnesses are possible, and the loom may still be used in a method consistent with the invention described herein, and the woven textile consistent with the invention described herein may still be made on such loom. The eighth actuator of the loom of FIG. 1 provides a greater range of woven patterns that may be woven along side the Braille cell, but its presence complicates the loom stringing process and the weaving process, and may confuse those first learning Braille. If simulating typing on the Perkins Brailler is not desired, then, as mentioned earlier, a loom with only six actuators will suffice. Looms with at least whole multiples of six levers offer the ability to weave more than one letter per woven weft thread.

Figure 9:
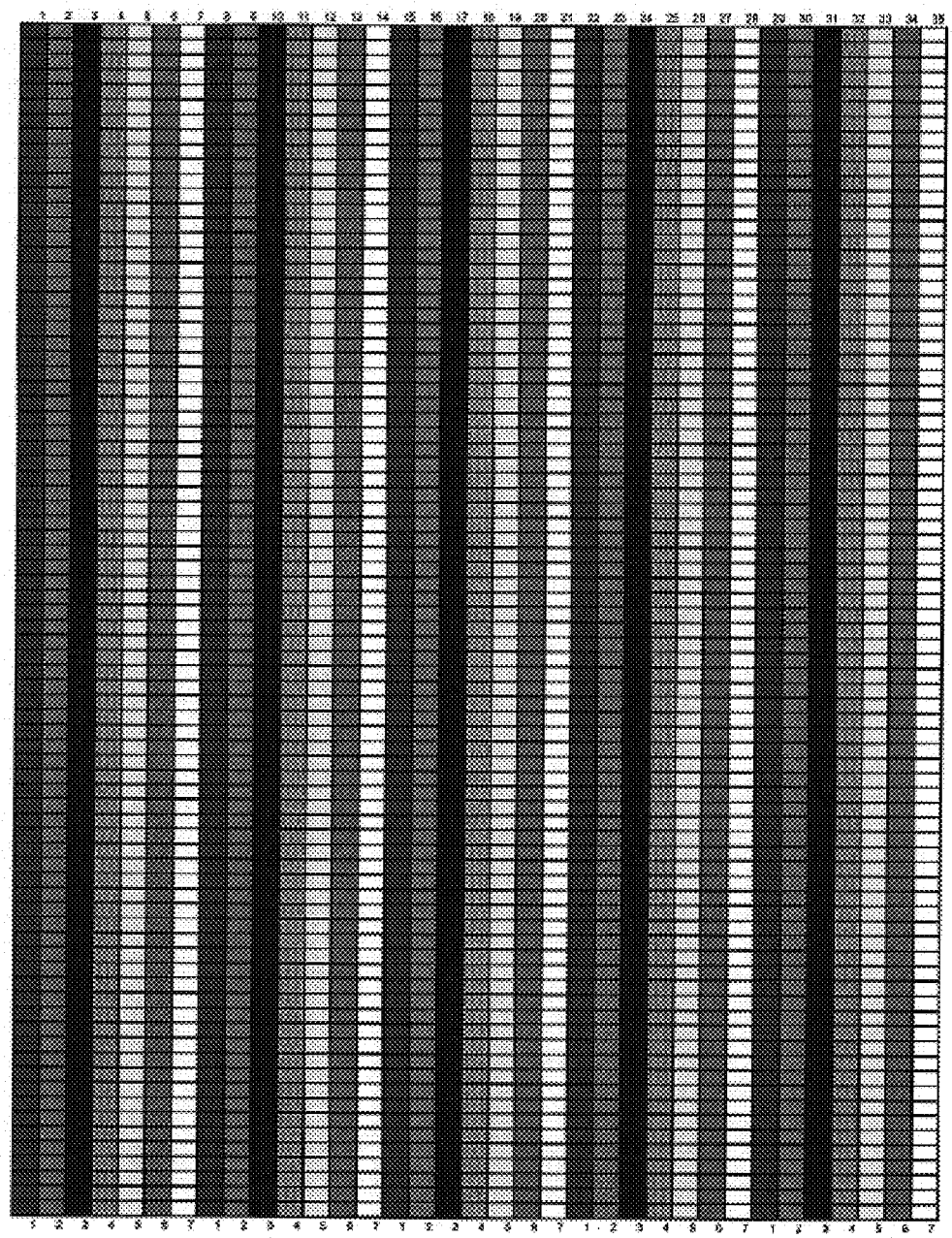
FIG. 9 is a schematic of a stringing pattern consistent with the invention and of FIG. 8.

FIG. 9 illustrates an embodiment consistent with an aspect of the invention. In particular, FIG. 9 illustrates the stringing pattern that is the end result of a method of stringing a loom with at least seven actuators: a number 1, number 2, number 3, number 4, number 5 and number 6 Braille cell actuators and at least one non-Braille cell actuator. In FIG. 9, the numbers along the top count the warp threads from left to right (1 to 35) and the numbers along the bottom correspond to the particular actuator (1–7) that separates this warp thread apart from the other warp threads. Thus, the stringing method comprises threading a first thread (warp thread 1) through a heddle connected to the number 1 Braille cell actuator (actuator 1), thereby creating a first number 1 Braille cell warp thread, threading a second thread (warp thread 2) through a heddle connected to the number 2 Braille cell actuator (actuator 2), thereby creating a first number 2 Braille cell warp thread, threading a third thread (warp thread 3) through a heddle connected to the number 3 Braille cell actuator (actuator 3), thereby creating a first number 3 Braille cell warp thread, threading a fourth thread (warp thread 4) through a heddle connected to the number 4 Braille cell actuator (actuator 4), thereby creating a first number 4 Braille cell warp thread, threading a fifth thread (warp thread 5) through a heddle connected to the number 5 Braille cell actuator (actuator 5), thereby creating a first number 5 Braille cell warp thread, threading a sixth thread (warp thread 6) through a heddle connected to a number 6. Braille cell actuator (actuator 6), thereby creating a first number 6 Braille cell warp thread, threading a seventh thread (warp thread 7) through a heddle connected to the first non-Braille cell actuator (actuator 7). The color of each of the first number 1 through number 6 Braille cell warp threads is different.

In this example, illustrated by FIG. 9, the pattern then repeats four times using warp threads 8–35. Thus, in this example, with reference to the loom of FIGS. 5–7, the first number 1 Braille cell warp thread and every successive seventh warp thread (i.e., 8, 15, 22, and 29) are each threaded through a separate heddle attached to harness 66 connected to lever 28 (the number 1 Braille cell actuator). In this example, the first number 2 Braille cell warp thread and every successive seventh warp thread (i.e., 9, 16, 23, and 30) are each threaded through a separate heddle attached to harness 68 connected to lever 26 (the number 2 Braille cell actuator). In this example, the first number 3 Braille cell warp thread and every successive seventh warp thread.

(i.e., 10, 17, 24, and 31) are each threaded through a separate heddle attached to harness 70 connected to lever 24 (the number 3 Braille cell actuator). In this example, the first number 4 Braille cell warp thread and every successive seventh warp thread (i.e., 11, 18, 25, and 32) are each threaded through a separate heddle attached to harness 72 connected to lever 34 (the number 4 Braille cell actuator). In this example, the first number 5 Braille cell warp thread and every successive seventh warp thread from the left (i.e., 12, 19, 26, and 33) are each threaded through a separate heddle attached to harness 74 connected to lever 36 (the number 5 Braille cell actuator). In this example, the first number 6 Braille cell warp thread and every successive seventh warp thread from the left (i.e., 13, 20, 27, and 34) are each threaded through a separate heddle attached to harness 76 connected to lever 38 (a number 6 Braille cell actuator). In this example, the first non-Braille warp thread (warp thread 7) and every successive seventh warp thread (i.e., 14, 21, 28, and 35) are each threaded through a separate heddle attached to harness 78 connected to lever 64 (a first non-Braille cell actuator).

In this example, the first number 1 through number 6 Braille cell warp threads are in numerical order and side by side in each Braille cell of warp threads and a non-Braille cell warp thread is on the right of and adjacent to the number 6 warp thread of each Braille cell of warp threads.

In FIG. 9, the colors of the warp threads are not the same, but are visibly different. The difference in color provides easy identification of those warp threads representing a particular raised dot in the Braille cell, versus those that are non-Braille warp threads. In this example, all of the warp threads connected to the number 1 Braille cell actuator are red. In this example, all of the warp threads connected to the number 2 Braille cell actuator are pink. In this example, all of the warp threads connected to the number 3 Braille cell actuator are black. In this example, all of the warp threads connected to the fourth Braille cell actuator are gray. In this example, all of the warp threads connected to the number 5 Braille cell actuator are yellow. In this example, all of the warp threads connected to the number 6 Braille cell actuator are orange. In this example, all of the warp threads connected to the seventh (non-Braille cell) actuator are white. In this example, the color of the seventh warp thread is also different from each of the first number 1 through number 6 Braille cell warp threads.

Figure 10:
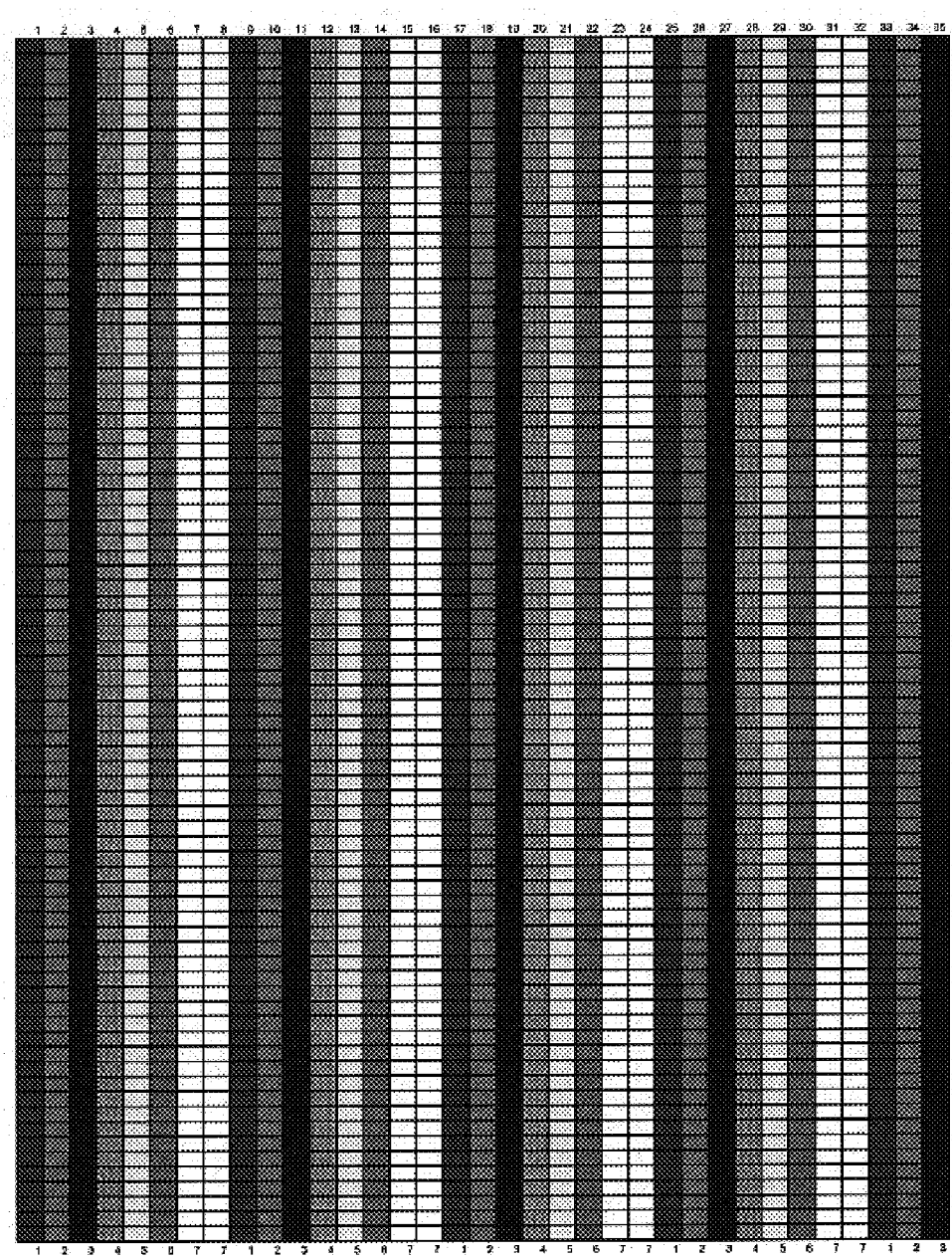
FIG. 10 illustrates another stringing pattern consistent with the invention for a loom with at least seven actuators.

Other methods of stringing and the resulting stringing patterns consistent with an aspect of the invention are also possible. For instance, a variation of the above stringing method consistent with the invention is described below. FIG. 10, like FIG. 9, illustrates 35 warp threads (1–35), and the number of the actuator to which each warp thread is connected (1–7). In FIG. 10, the number of warp threads separating each set of number 1 through number 6 Braille cell warp threads or "Braille cell" of warp threads is two. Thus, the stringing method comprises threading a first thread (warp thread 1) through a heddle connected to the number 1 Braille cell actuator (actuator 1), thereby creating a first number 1 Braille cell warp thread, threading a second thread (warp thread 2) through a heddle connected to the number 2 Braille cell actuator (actuator 2), thereby creating a first number 2 Braille cell warp thread, threading a third thread (warp thread 3) through a heddle connected to the number 3 Braille cell actuator (actuator 3), thereby creating a first number 3 Braille cell warp thread, threading a fourth thread (warp thread 4) through a heddle connected to the number 4 Braille cell actuator (actuator 4), thereby creating a first number 4 Braille cell warp thread, threading a fifth thread (warp thread 5) through a heddle connected to the number 5 Braille cell actuator (actuator 5), thereby creating a first number 5 Braille cell warp thread, threading a sixth thread (warp thread 6) through a heddle connected to a number 6 Braille cell actuator (actuator 6), thereby creating a first number 6 Braille cell warp thread. In this example, a seventh and eighth thread (warp threads 7 and 8) are connected to the first non-Braille cell actuator (actuator 7), thereby creating the first and second non-Braille cell warp threads. In this example, the pattern then repeats three times with warp thread 9–32 creating three other Braille cells of warp threads, a second number 1 through number 6 Braille cell warp threads, and a third number 1 through number 6 Braille cell warp threads. In this example, within each Braille cell of warp threads, the first number 1 through number 6 Braille cell warp threads are in numerical order from left to right on the loom.

The number of adjacent non-Braille cell warp threads connected to the first non-Braille cell actuator may be greater or smaller and still be consistent with the invention. The greater the number, the looser the resulting woven textile will be, as the tightness of a woven textile depends not only on the tension of the warp and weft threads, but also on the amount of weaving of the warp and weft threads.

As illustrated in FIG. 10, the color of each of the warp threads is not the same, but provides easy identification of those warp threads representing a particular raised dot in the Braille cell, versus those that are non-Braille warp threads.

The choice of colors for this example are the same as for the example illustrated in FIG. 9 and will not be described again.

Figure 11:
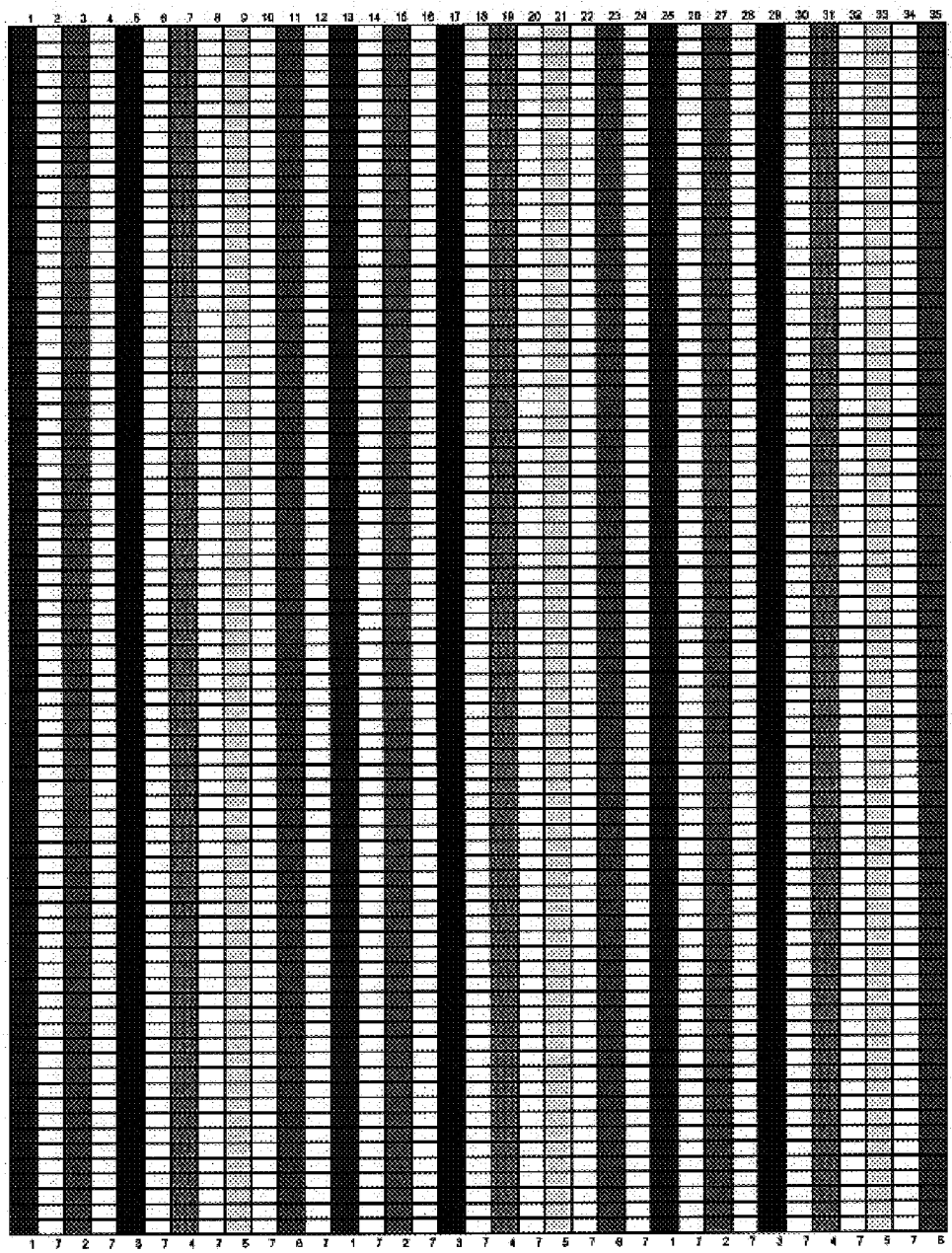
FIG. 11 illustrates another stringing pattern consistent with the invention for a loom with at least seven actuators.

FIG. 11 illustrates another example of a stringing pattern consistent with the invention, where every other warp thread is connected to a non-Braille cell actuator. FIG. 11, like FIG. 9, illustrates 35 warp threads (1–35) and the actuator to which each one is connected (1–7). Specifically, in this example, a first thread (warp thread 1) is connected to the number 1 Braille cell actuator (actuator 1), thereby creating a first number 1 Braille cell warp thread, a second thread (warp thread 3) is connected to the number 2 Braille cell actuator (actuator 2), thereby creating a first number 2 Braille cell warp thread, a third thread (warp thread 5) is connected to the number 3 Braille cell actuator (actuator 3), thereby creating a first number 3 Braille cell warp thread, a fourth thread (warp thread 7) is connected to the number 4 Braille cell actuator (actuator 4), thereby creating a first number 4 Braille cell warp thread, a fifth thread (warp thread 9) is connected to the number 5 Braille cell actuator (actuator 5), thereby creating a first number 5 Braille cell warp thread, a sixth thread (warp thread 11) is connected to the number 6 Braille cell actuator (actuator 6), thereby creating a first number 6 Braille cell warp thread. In this example, a seventh thread (warp thread 2) is connected to the first non-Braille cell actuator (actuator 7), thereby creating the first non-Braille cell warp thread. A eighth (warp thread 4), ninth (warp thread 6), tenth (warp thread 8), eleventh (warp thread 10), and a twelfth (warp thread 12) thread are also connected to the first non-Braille cell actuator, thereby creating the second, third, fourth, fifth, and sixth non-Braille cell warp threads. In this example the pattern repeats two times using warp threads 13–35, creating a second Braille cell of warp threads: a second number 1 through number 6 Braille cell warp threads, and a third Braille cell of warp threads: a third number 1 through number 6 Braille cell warp threads. In this example, as in the others, it can be seen that within each Braille cell of warp threads, the number 1 through number 6 Braille cell warp threads are in numerical order from left to right on the loom. In this example, each Braille cell warp thread is adjacent to a non-Braille cell warp thread.

As illustrated in FIG. 11, the colors of the warp threads are not the same, and this provides easy identification of those warp threads representing a particular raised dot in the Braille cell, versus those that are non-Braille warp threads. The choice of colors for this example is the same as for the example illustrated in FIG. 9 and will not be described again.

Figure 12:
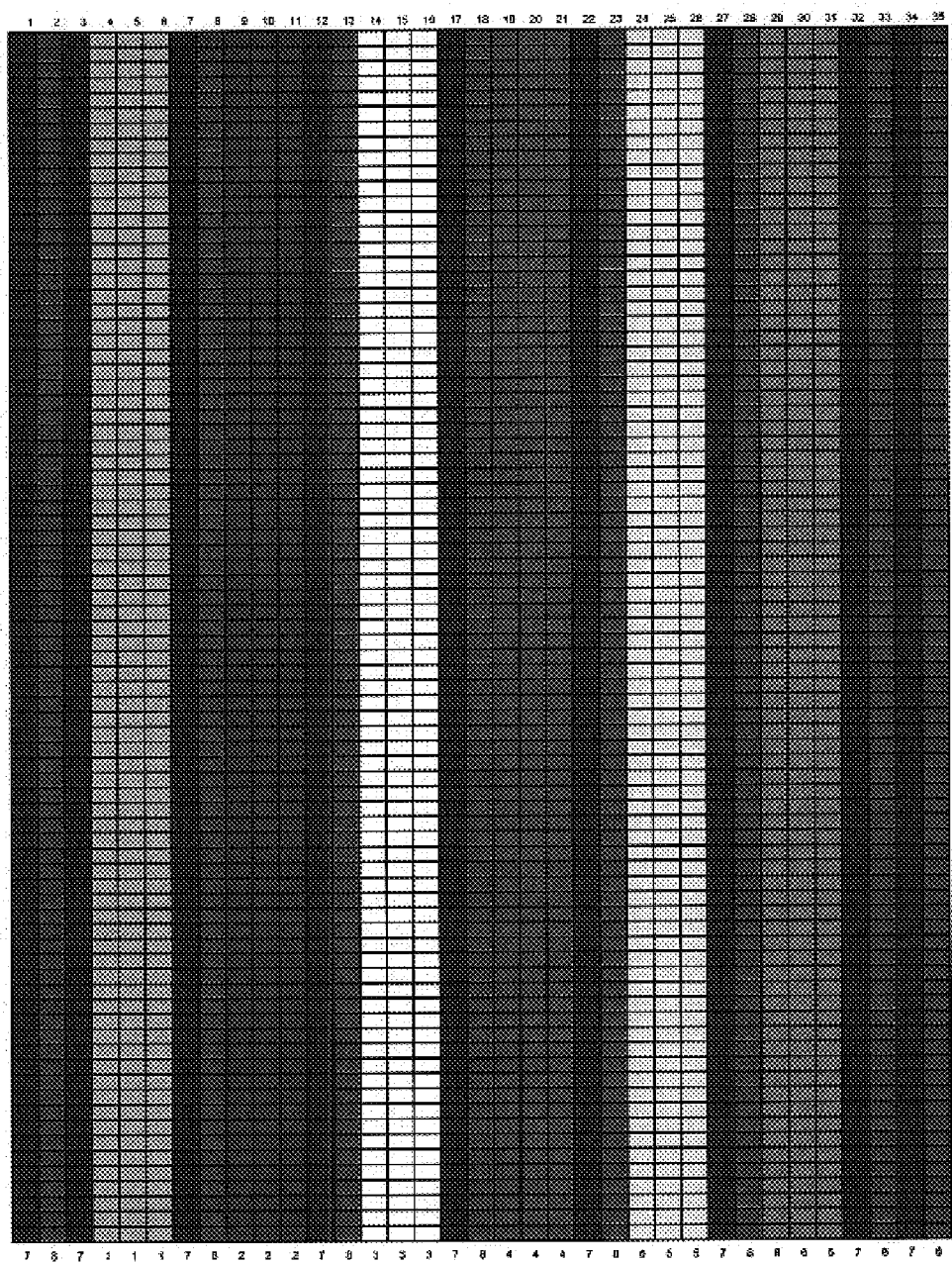
FIG. 12 illustrates a stringing pattern consistent with the invention for a loom with at least eight actuators.

Another example of a stringing pattern consistent with the invention requires a loom with at least eight actuators: a number 1, number 2, number 3, number 4, number 5, and number 6 Braille cell actuator and at least a first and second non-Braille cell actuators. FIG. 12 illustrates this 35 warp thread example and the actuators to which each warp thread is connected (1–8). In this example, 18 of the 35 warp threads are in six groups of three adjacent Braille cell warp threads, each group connected to one of the six Braille cell actuators. In this example, between each groups of Braille cell warp threads, one non-Braille cell warp thread is connected to a first non-Braille cell actuator and one non-Braille cell warp thread in connected to a second non-Braille cell actuator. On either end of the stringing pattern, the warp threads are connected alternately to the first and second non-Braille cell actuators.

As illustrated in FIG. 12, in this example, a first thread (warp thread 4) is threaded through a heddle connected to the number 1 Braille cell actuator (actuator 1), thereby creating the first number 1 Braille cell warp thread. In this example, a second thread (warp thread 9) is threaded through a heddle connected to the number 2 Braille cell actuator (actuator 2), thereby creating the first number 2 Braille cell warp thread. In this example, a third thread (warp thread 14) is threaded through a heddle connected to the number 3 Braille cell actuator (actuator 3), thereby creating the first number 3 Braille cell warp thread. In this example, a fourth thread (warp thread 19) is threaded through a heddle connected to the number 4 Braille cell actuator (actuator 4), thereby creating the first number 4 Braille cell warp thread. In this example, a fifth thread (warp thread 24) is threaded through a heddle connected to the number 5 Braille cell actuator (actuator 5), thereby creating the first number 5 Braille cell warp thread. In this example, a sixth thread (warp thread 29) is threaded through a heddle connected to a number 6 Braille cell actuator (actuator 6), thereby creating the first number 6 Braille cell actuator. A seventh thread (warp thread 1) is threaded through a heddle connected to the first non-Braille cell actuator (actuator 7), thereby creating the first non-Braille cell warp thread.

In this example, however, warp threads 5 and 6 are also connected to the number 1 Braille cell actuator, thereby creating the second and third number 1 Braille cell warp threads. In this example, warp threads 10 and 11 are also connected to the number 2 Braille cell actuator, thereby creating the second and third number 2 Braille cell warp threads. In this example, warp threads 15 and 16 are also connected to the number 3 Braille cell actuator, thereby creating the second and third number 3 Braille cell warp threads. In this example, warp threads 20 and 21 are also connected to the number 4 Braille cell actuator, thereby creating the second and third number 4 Braille cell warp threads. In this example, warp threads 25 and 26 are also connected to the number 5 Braille cell actuator, thereby creating the second and third number 5 Braille cell warp threads. In this example, warp threads 30 and 31 are also connected to the number 6 Braille cell actuator, thereby creating the second and third number 6 Braille cell warp threads.

In this example, warp threads 3, 7, 12, 17, 22, 27, 32, and 34 are also threaded through heddles connected to the first non-Braille cell actuator (actuator 7), thereby creating the second, third, fourth, fifth, sixth, seventh, eighth, and ninth non-Braille cell warp threads. In this example, warp threads 2, 8, 18, 23, 28, 33, and 35 are threaded through heddles connected to the second non-Braille cell actuator (actuator 8), thereby creating the tenth, eleventh, twelfth, thirteenth, fourteenth, fifteenth, and sixteenth non-Braille warp threads.

In FIG. 12, the colors of all the warp threads are not the same, and this provides easy identification of those warp threads representing a particular raised dot in the Braille cell, versus those that are non-Braille warp threads. In this example, all warp thread connected to the number 1 Braille cell actuator are colored melon. In this example, all warp threads connected to the number 2 Braille cell actuator are colored hot pink. In this example, all warp threads connected to the number 3 Braille cell actuator are colored white. In this example, all warp threads connected to the fourth Braille cell actuator are colored orange. In this example, all warp threads connected to the number 5 Braille cell actuator are colored lemon yellow. In this example, all warp thread connected to the number 6 Braille cell actuator are colored pink. In this example, all warp thread connected to the first non-Braille actuator are colored magenta. In this example, all warp threads connected to the second non-Braille actuator are colored dark teal.

Figure 13:
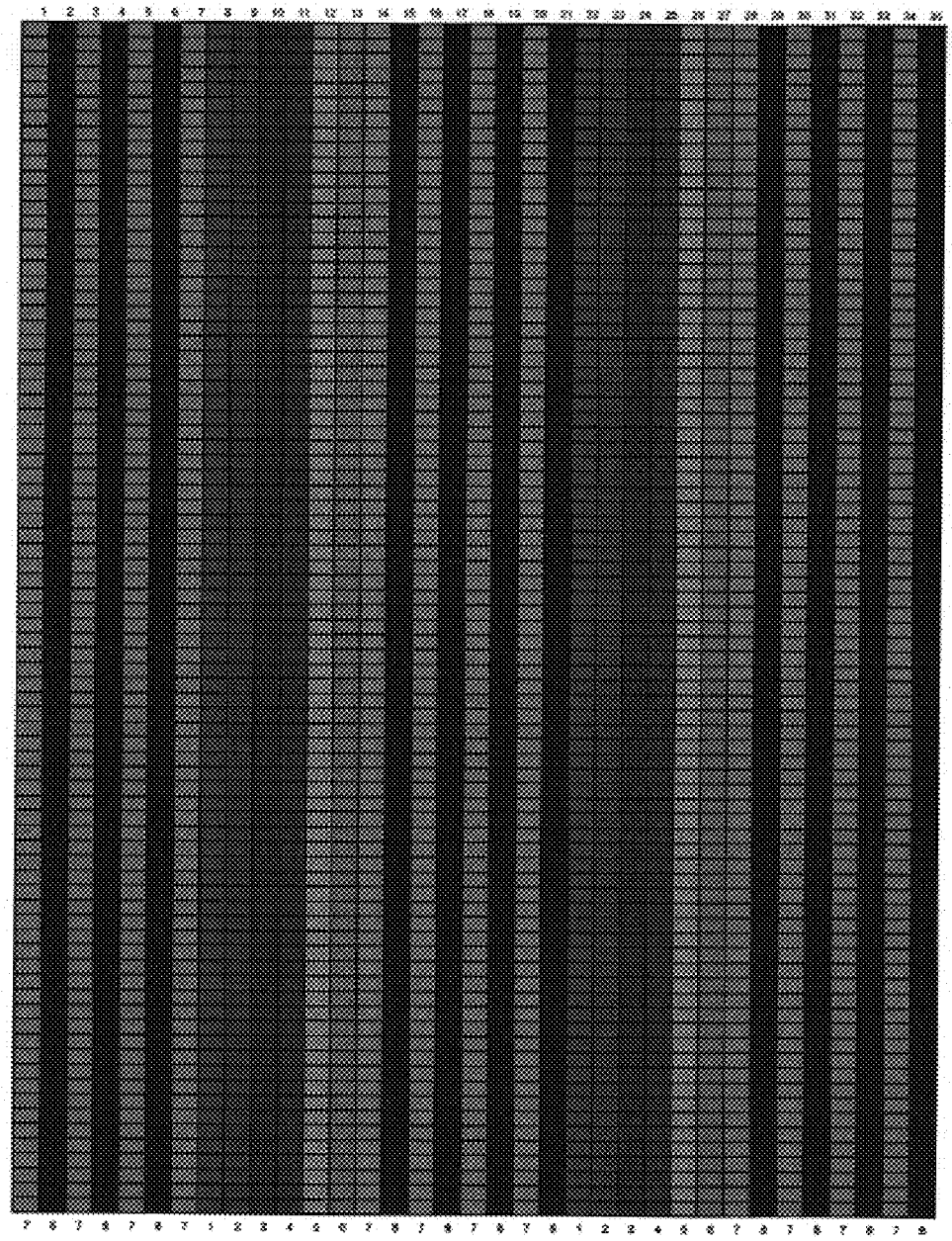
FIG. 13 illustrates another stringing pattern consistent with the invention for a loom with at least eight actuators.

Another example of a stringing pattern consistent with the invention also requires a loom with at least eight actuators: a number 1, number 2, number 3, number 4, number 5, and number 6 Braille cell actuator and at least a first and second non-Braille cell actuator. FIG. 13 illustrates a 35 warp thread stringing pattern and the actuator to which each warp thread is connected (1–8). In this example, the number 1 through number 6 Braille cell warp threads are in numerical order and are connected to the number 1 through number 6 Braille cell actuators, respectively. In this example, however, a set of non-Braille cell warp threads separates the two Braille cells of warp threads. In this example, in general, these sets of "filler" warp threads alternate between actuators 7 and 8.

Referring to FIG. 13, warp threads 8 and 22 are threaded through heddles connected to the number 1 Braille cell actuator (actuator 1) and are therefore the first and second number 1 Braille cell warp threads. Note that warp thread 22 is 14 warp threads to the right of warp thread 8, 14 being two multiples of seven. In this example, warp threads 9 and 23 are threaded through heddles connected to the number 2 Braille cell actuator (actuator 2) and are therefore the first and second number 2 Braille cell warp threads. Again, warp thread 23 is 14 warp threads to the right of warp thread 9. In this example, warp threads 10 and 24 are threaded through heddles connected to the number 3 Braille cell actuator (actuator 3) and are therefore the first and second number 3 Braille cell warp threads. Again, warp thread 24 is 14 warp threads to the right of warp thread 10. In this example, warp threads 11 and 25 are threaded through heddles connected to the number 4 Braille cell actuator (actuator 4) and are therefore the first and second number 4 Braille cell warp threads. Again warp thread 25 is 14 warp threads to the right of warp thread 11. In this example, warp threads 12 and 26 are threaded through heddles connected to the number 5 Braille cell actuator (actuator 5) and are therefore the first and second number 5 Braille cell warp threads. Again, warp thread 26 is 14 warp threads to the right of warp thread 12. In this example, warp threads 13 and 27 are threaded through heddles connected to a number 6 Braille cell actuator (actuator 6) and are therefore the first and second number 6 Braille cell warp threads. Again, warp thread 27 is 14 warp threads to the right of warp thread 13. In this example, warp threads 1, 3, 5, 7, 14, 16, 18, 20, 28, 30, 32, and 34 are threaded through heddles connected to a first non-Braille cell actuator (actuator 7) and are therefore the first through twelfth non-Braille cell warp threads. In this example, warp threads 2, 4, 6, 15, 17, 18, 21, 29, 31, 33, and 35 are threaded through heddles connected to a second non-Braille cell actuator (actuator 8) and are therefore the thirteenth through twenty-third non-Braille cell warp threads.

In FIG. 13, the colors of all warp threads are not the same. In this example, all warp threads connected to the number 1 Braille cell actuator are hot pink. In this example, all warp threads connected to the number 2 Braille cell actuator are emerald green. In this example, all warp threads connected to the number 3 Braille cell actuator are magenta. In this example, all warp threads connected to the fourth Braille cell actuator are colored royal blue. In this example, all warp threads connected to the number 5 Braille cell actuator are colored sky blue. In this example, all warp threads connected to the number 6 Braille cell actuator are colored lavender. In this example, all warp threads connected to the first non-Braille cell actuator are orange. In this example, all warp threads connected to the second non-Braille cell actuator are black.

Figure 14:
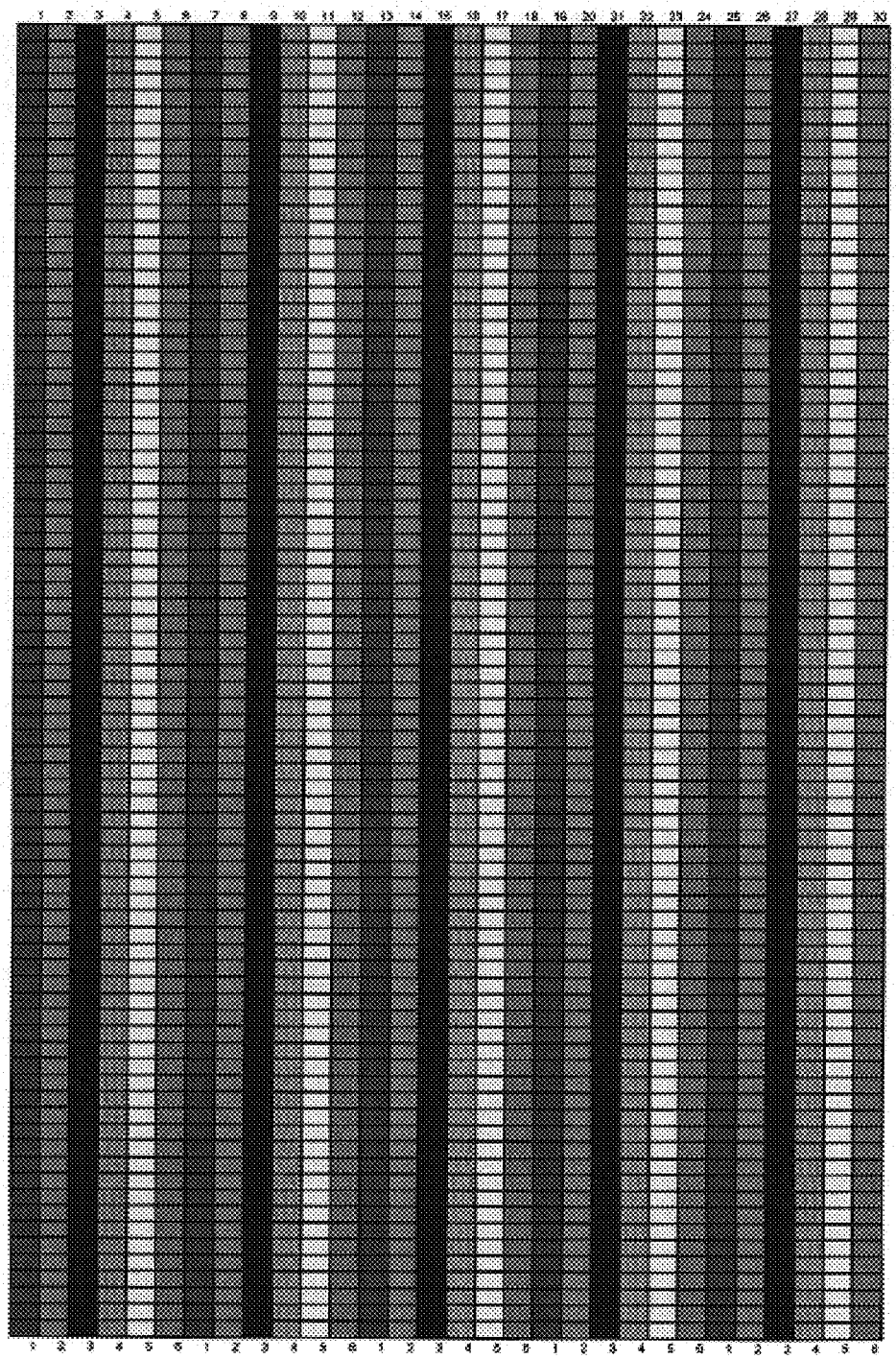
FIG. 14 illustrates another stringing pattern consistent with the invention for a loom with at least six actuators.

Another example of a stringing pattern consistent with the invention requires a loom with at least six actuators: a number 1, number 2, number 3, number 4, number 5, and number 6 Braille cell actuator. FIG. 14 illustrates a 30 warp stringing pattern and the actuator to which each warp thread is connected (1–6). In this example, the method of stringing the loom is the same as is described with respect to FIG. 9, but no threads are threaded through heddles attached to a non-Braille cell actuator. Thus, in this example, there are no non-Braille cell warp threads. In this example, the number 1 through number 6 Braille cell warp threads are in numerical order and art connected to the number 1 through number 6 Braille cell actuators, respectively.

In FIG. 14, the colors of all warp threads are not the same. In this example, the colors are the same as in FIG. 9. In other words, in this example, all warp threads connected to the number 1 Braille cell actuator are colored red. In this example, all warp threads connected to the number 2 Braille cell actuator are colored pink. In this example, all warp threads connected to the number 3 Braille cell actuator are colored black. In this example, all warp threads connected to the fourth Braille cell actuator are colored gray. In this example, all warp threads connected to the number 5 Braille cell actuator are colored yellow. In this example, all warp threads connected to the number 6 Braille cell actuator are colored orange.

The warp thread color selections are not limited to the particular colors illustrated in FIGS. 9–14. In choosing the colors for the warp threads, one should avoid hues that are close enough in shade to "fool" a sighted person's eyes into thinking the are the same shade, thus the higher contrast between Braille cell warp thread near each other, the better. The selection of color of each warp and weft thread may affect the speed with which a sighted person may decipher or read the woven Braille cell. The more contrast between warp threads adjacent to a warp thread that represents a dot in the Braille cell, the easier to detect, by eye, which positions of the Braille cell that are represented. Obviously, the greater difference in the wavelength of the color of adjacent warp threads, the easier to detect each warp thread's presence over a weft thread.

Another optional feature which may provide higher contrast is the texture of each Braille warp thread. If the texture of all Braille cell warp threads is the same, then it helps distinguish by sight and feel where the Braille cell ends by making the non-Braille warp thread a different texture, or all warp threads connected to the first (or greater) non-Braille cell actuator a texture different than the texture of the Braille cell warp threads.

Figure 15:
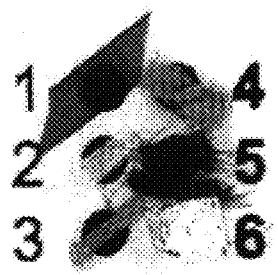
FIG. 15 illustrates six exemplary threads for number 1 through number 6 Braille cell warp threads.

FIG. 15 illustrates exemplary threads for use in a stringing pattern where all warp threads connected to the number 1 Braille cell actuator have the same texture, which is different than all the other warp threads, and all warp threads connected to the number 2 Braille cell actuator have the same texture, which is different than all the other warp threads, and so forth for each set of warp threads connected to one of the six Braille cell actuators. Then, contrast will exist between textures of each of the number 1 through number 6 Braille cell warp threads, making it easier to determine by view or by feel which raised dots in a Braille cell are represented by a particular Braille cell warp thread.

In FIG. 15, the thread selected for the number 1 Braille cell warp thread is a ¼" wide, red, organdy ribbon, identified as Morex 91801-609 red, from Morex Corp., located in York, Pa. In FIG. 15, the thread selected for the number 2 Braille cell warp thread is a ⅛" wide, yellow ribbon, identified as RN 17991. In FIG. 15, the thread selected for the number 3 Braille cell warp thread is a 1/16" diameter cording, identified as #1305-536 antique gold, rat tail, sold by Morex Corp., but made in Taiwan. In FIG. 15, the thread selected for the number 4 Braille cell warp thread is a 1/8" diameter, light green yarn, made up of 55% Merino wool, 33% microfibre, and 12% Cashmere, sold by Debbie Bliss. In FIG. 15, the thread selected for the number 5 Braille cell warp thread is a 3/16" diameter, 3-ply natural-jute, dyed green twine. It is sold by Frank W. Winn & Sons, Inc., and made in Thailand. In FIG. 15, the thread selected for the number 6 Braille cell warp thread is a 3/8" wide woven metallic silver ribbon of unknown content or source.

It should also be mentioned that the number of warp threads strung on a loom is a decision for the weaver to make, and as long as there are at least six different-colored warp threads, the stringing pattern may be consistent with an aspect of the invention.

Other embodiments consistent with an aspect of the invention is a method of weaving a higher contrast Braille and the resulting woven textile. The method comprises threading a loom with a stringing pattern as described previously, wherein the warp threads representing the six raised dots of the Braille cell are visually distinguishable colors, and weaving selected Braille cells optionally separated by at least one filler weft thread. The weft thread used to weave the selected Braille cell will be the background for, or, in other words, under, the Braille cell warp threads representing the raised dots present in the Braille cell being woven. This weft thread is called a "reading content" weft thread. Optionally, after every woven weft thread, "beater" bar 61 (illustrated in FIGS. 1 and 5) is rotated at least once toward the woven weft thread bringing it into contact with either the boundary created by the knotted warp threads, or object, such as cloth or cardboard, placed in the warp threads at the beginning of the weaving, or a previously woven weft thread.

Figure 16:
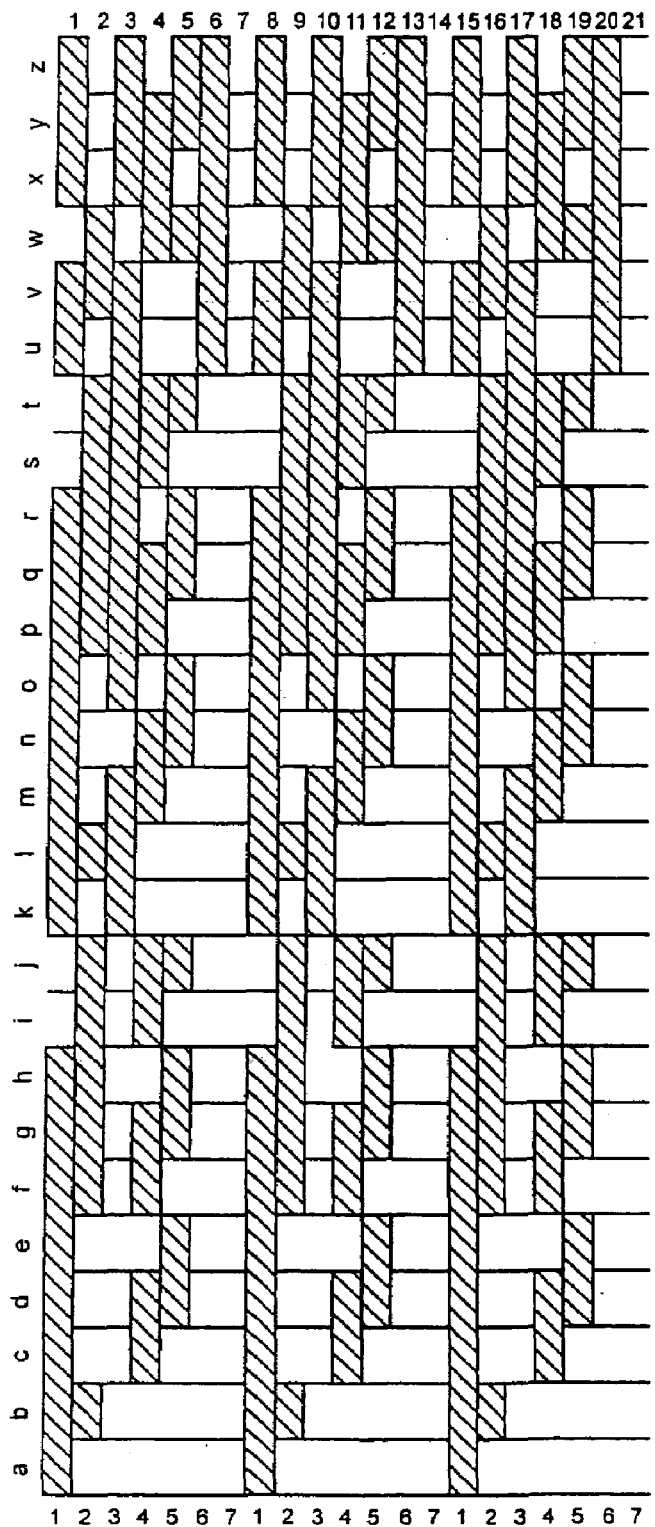
FIG. 16 is a schematic of a weaving pattern on part of the stringing pattern of FIG. 9 and of a woven textile consistent with the invention.

An example of a woven textile embodiment is illustrated in FIG. 16. Here, the stringing pattern illustrated in FIG. 9 was used for weaving the alphabet. In FIG. 9, there are three Braille cells of warp threads with a non-Braille cell warp thread adjacent to the number 6 Braille cell warp thread in each Braille cell. In this example, the letters of the alphabet are woven in order, starting with "a." In this example, the raised dots in the Braille cell representing the letter "a" are determined. Number 1 Braille cell actuator is moved and optionally secured, separating warp threads 1, 8, and 15 from the remainder of the warp threads, creating a shed therebetween. In this example, a first reading content weft thread is passed through the shed. In this example, Braille cell actuator 1 is released. In this example, the raised dots in the Braille cell representing the letter "b" are determined. In this example, Braille cell actuators number 1 and number 2 are moved and optionally secured, creating a shed between warp threads 1, 2, 8, 9, 15, and 16 and the remaining warp threads. In this example, a second reading content weft thread is passed through the shed. In this example, if the second reading content weft thread is attached to the first reading content weft thread, it may have to be hand woven under warp thread 1 so as not to pull the first reading content weft thread out of the shed. In this example, this extra step may be avoided if another weft thread is used for the second reading content weft thread. In this example, the process repeats for each Braille cell from c to z, with only the Braille cell actuator numbers changing as appropriate to represent the selected letter of the alphabet.

Figure 17:
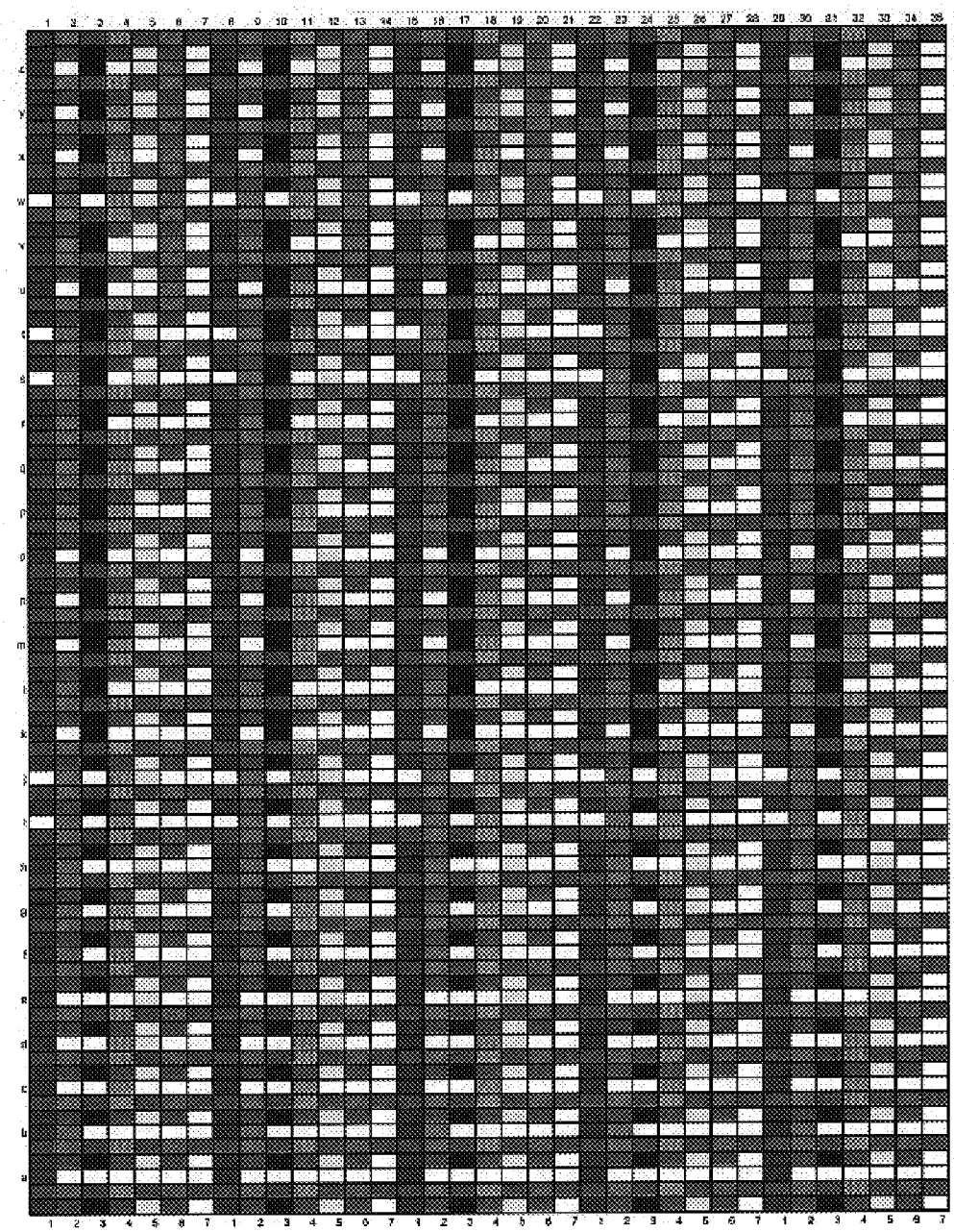
FIG. 17 is a schematic of a woven textile consistent with the invention using the stringing pattern of FIG. 9.

In another example, illustrated by FIG. 17, the stringing pattern and color selection of FIG. 9 is also used. In general, this woven textile contains 26 reading content weft threads, one for each of the Braille cells a through z, separated by 2 weft threads woven in alternating filler patterns. Weft threads woven in filler patterns are called filler weft threads.

Specifically, as illustrated in FIG. 17, the example begins with a filler pattern. In this example, weaving a first filler pattern consists of moving number 1, number 3, and number 5 Braille cell actuators and the first non-Braille cell actuator, to separate every other warp thread from the remainder. Specifically, in this example, warp threads 1, 3, 5, 7, 8, 10, 12, 14, 15, 17, 19, 21, 22, 24, 26, 28, 29, 31, 33, and 35 are separated above the remaining warp threads, creating a shed therebetween. A first filler weft thread having a blue color is passed through the shed. In this example, actuators 1, 3, 5, and 7 are released. In this example, a second filler pattern is then woven. Specifically, in this example, actuators 2, 4, and 6 are moved, and optionally secured, separating every other warp thread from the remaining warp threads. Specifically, in this example, warp threads 2, 4, 6, 9, 11, 13, 16, 18, 20, 23, 25, 27, 30, 32, and 34 are separated above the remaining warp thread, creating a shed therebetween. In this example, a second filler weft thread having a blue color is passed through the shed.

In this example, a selected Braille cell is then woven. In this example, as in the last, the selected Braille cell is an "a." The actuators to move to weave an "a" Braille cell are determined as described earlier. Thus, in this example, number 1 Braille cell actuator is moved, separating red warp threads 1, 8, 15, 22, and 29 above the remaining warp threads, creating a shed therebetween. In this example, a first reading content weft thread having a white color is passed through the shed. In this example, number 1 Braille cell actuator is released. In this example, a third filler weft thread is woven in the first filler pattern as previously described. In this example, a fourth filler weft thread is woven in the second filler pattern as previously described. This process repeats, with the actuators moved for each Braille cell c through z being determined as previously described.

Figure 18:
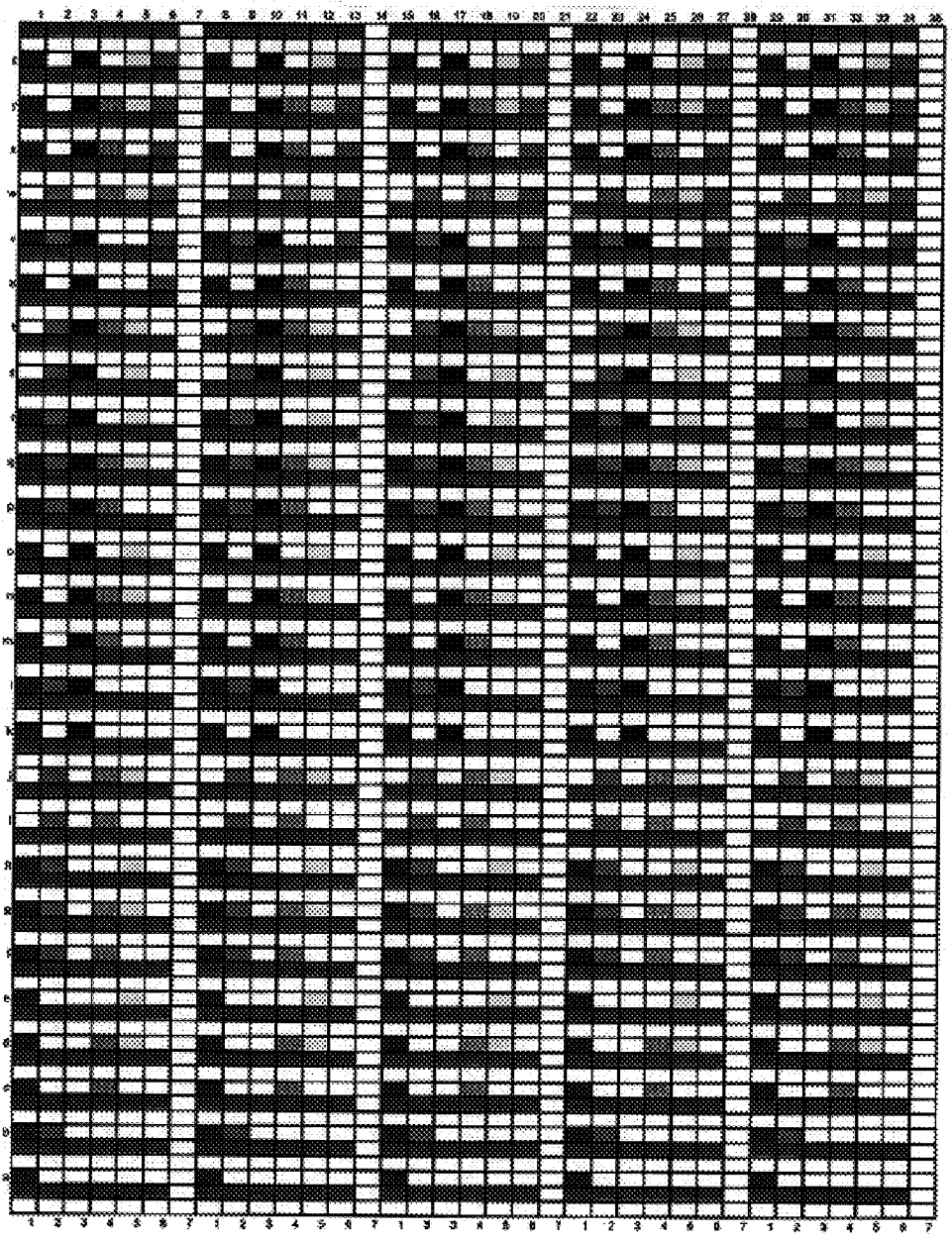
FIG. 18 is a schematic of a woven textile consistent with the invention using the stringing pattern of FIG. 9.

FIG. 18 is a schematic of a woven textile consistent with an aspect of the invention. The woven textile of FIG. 18, is made by the same weaving method as the example of FIG. 17, except the filler pattern is the same for all filler weft threads and is a third filler pattern. In this example, the filler pattern is moving only non-Braille actuator 7. In this example, the color of the filler weft threads alternates between a blue color and a white color. In practice the two filler weft threads may twist together rather than lie side by side. Moreover, because the filler weft threads are not woven with many warp threads, the filler weft threads may be at the same height from the warp threads as the reading content weft thread, but may also rise above the reading content threads unless secured to the warp threads belwo. When the filler weft threads rise above the reading content weft thread, it makes reading the woven Braille more difficult. Due to the color of the filler weft thread matching the color of the non-Braille warp threads 7, 14, 21, 28, and 25, one cannot see from the figure that the above-mentioned non-Braille warp threads are woven over the white filler weft thread.

Figure 19:
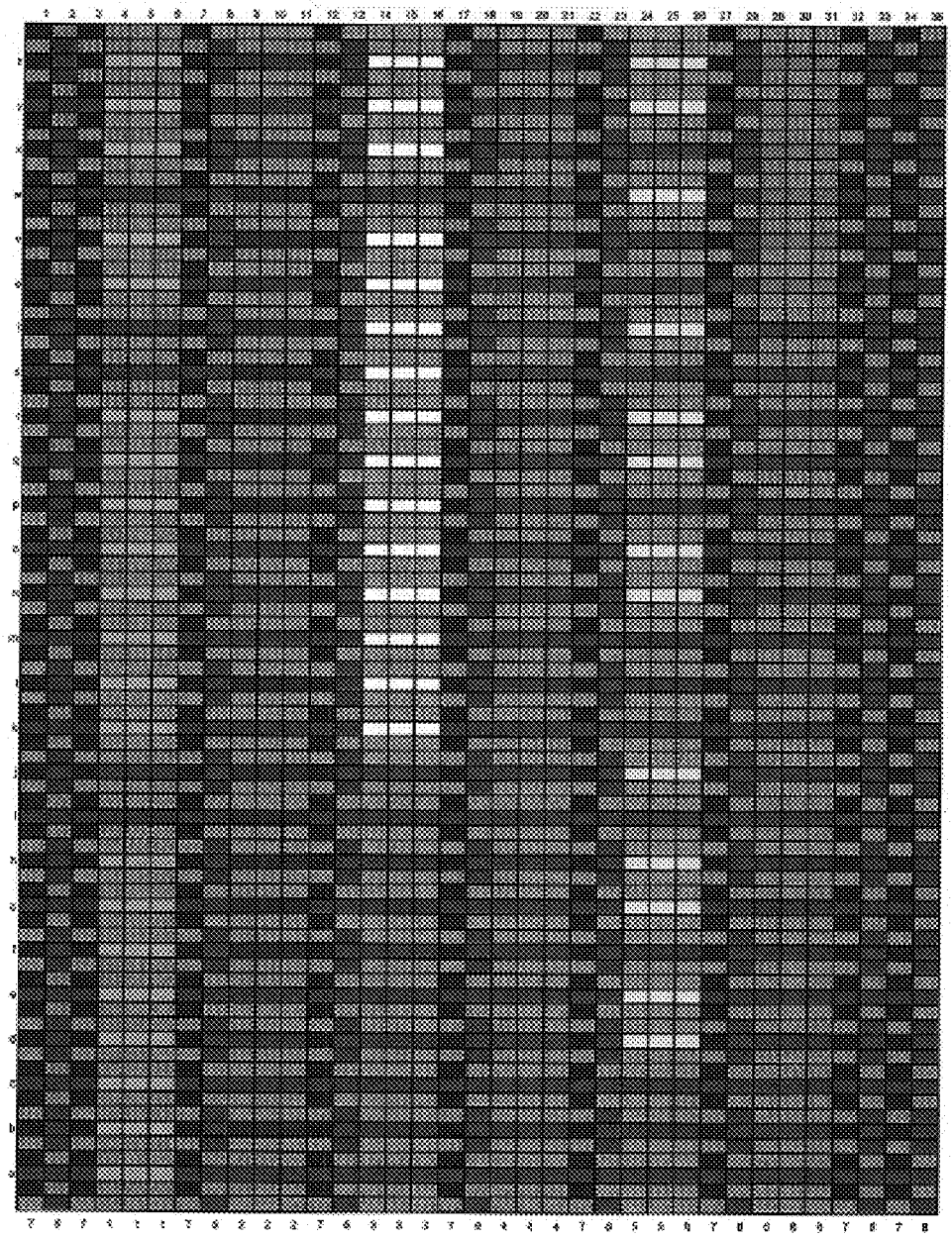
FIG. 19 is a schematic of a woven textile consistent with the invention using the stringing pattern of FIG. 12.

FIG. 19 illustrates a woven textile consistent with an aspect of the invention. The woven textile uses the stringing pattern of FIG. 12 for the warp threads and, like FIGS. 16, 17, and 18, has 26 reading content weft threads, one for each letter of the alphabet, starting with a and ending with z. In this example, the woven textile also has a least one filler weft thread woven in a fourth filler pattern as described above with respect to FIG. 16, and one filler weft thread woven in a fifth filler pattern, between each reading content weft thread.

Specifically, in this example, the method of weaving begins with a first filler weft thread woven in a fifth filler pattern. Due to the different stringing pattern from that in FIGS. 17 and 18, moving the same actuator may create a different filler pattern. In this example, a first non-Braille cell actuator (actuator 8) is moved, separating all non-Braille cell warp threads connected to actuator 8 above the remaining warp threads. Specifically, warp threads 2, 8, 13, 16, 23, 28, 33, and 35 are raised above the remaining warp threads, creating a shed therebetween. In this example, a first filler weft thread having a gray color is passed through the shed. In this example, actuator 8 is released. In this example, a second filler weft thread is woven in the fourth filler pattern. Thus, in this example, a second non-Braille cell actuator (actuator 7) is moved to separate all non-Braille cell warp threads connected to it. Specifically, warp threads 1, 3, 7, 12, 17, 22, 27, 32, and 34 are raised above the remaining warp threads, creating a shed therebetween. A second filler weft thread having a gray color is passed through the shed. In this example, actuator 7 is released.

In this example, a selected Braille cell is then woven. In this example, the selected letter is "a," and the corresponding Braille cell actuators to move to represent the Braille cell "a" have been determined as previously described. In this example, number 1 Braille cell actuator is moved to separate all Braille cell warp threads connected to it from the remaining warp threads. In this example, non-Braille cell actuator 8 is also moved to separate all non-Braille cell warp threads connected to it from the remaining warp threads. Specifically, then, in this example, first, second, and third number 1 Braille cell warp threads (warp threads 4 through 6) and non-Braille cell warp threads 2, 8, 13, 16, 23, 28, 33, and 35 are separated from the remaining warp threads, creating a shed therebetween. A first reading content weft thread having a blue color visually indistinguishable from the color of the warp threads connected to actuator 8 is passed through the shed.

In this example, two more filler weft threads are woven next. The third filler weft thread having a gray color is woven with the fourth filler pattern as described above. The fourth filler weft thread having a gray color is woven with the fifth filler pattern as described above. In this example, a second selected Braille cell is woven next. In this example, that is Braille cell "b." The corresponding actuators to move to represent the raised dots in the Braille cell "b" were determined as previously described. Braille cell actuators number 1 and number 2 are moved to separate all warp threads connected to them from the remaining warp threads. In this example, non-Braille cell actuator 7 is also moved to separate all warp thread connected to it from the remaining warp threads. Specifically, then, in this example, first, second, and third number 1 Braille cell warp threads (warp threads 4 through 6) and first, second, and third number 2 Braille cell warp threads (warp threads 9 through 11) and non-Braille cell warp threads 1, 3, 7, 12, 17, 22, 27, 32, and 34 are separated above the remaining warp threads. In this example, a second reading content weft thread having a blue color like the first reading content weft thread is woven next.

In this example, the pattern of two filler weft threads being woven in alternating filler patterns is repeated. In this example, an alternating non-Braille cell actuator is moved in addition to the determined Braille cell actuators to represent the selected Braille cell to be woven. This is done, in this example, to weave the reading content threads into the woven textile more than with just the Braille warp threads. This additional step may be omitted and just the Braille cell actuators may be moved. However, the resulting reading content weft thread will be loosely woven into the woven textile at times, like, for example, any Braille cell with just one raised dot therein. By expanding the region where a raised dot of a Braille cell is represented in the woven textile and separating it from the other regions of warp threads representing other dots in the Braille cell, the Braille cell is easier to detect.

Figure 20:
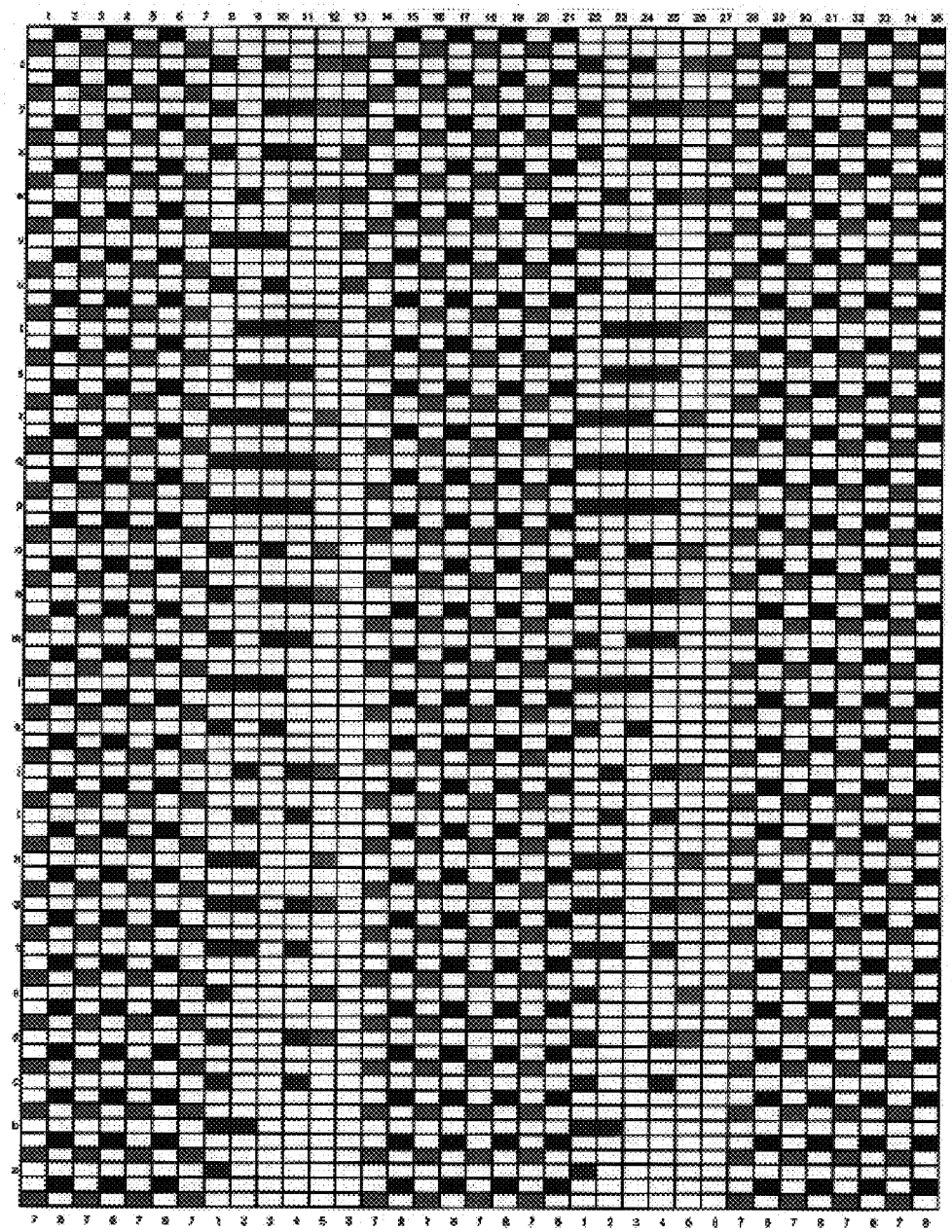
FIG. 20 is a schematic of a woven textile consistent with the invention using the stringing pattern of FIG. 13.

FIG. 20 illustrates another example of a woven textile consistent with an aspect of the invention. The woven textile uses the stringing pattern of FIG. 13 for the warp threads and, like FIGS. 16, 17, 18, and 19, has 26 reading content weft threads, one for each letter of the alphabet, starting with a and ending with z. In this example, the woven textile also has a least one filler weft thread woven in a sixth filler pattern (accomplished by moving the first non-Braille cell actuator (actuator7)), and one filler weft thread woven in a seventh filler pattern (accomplished by moving the second non-Braille cell actuator (actuator 8), before and after each reading content weft thread. In this example, all weft threads have the same butter color. This color is different than all of the warp threads.

Figure 21:
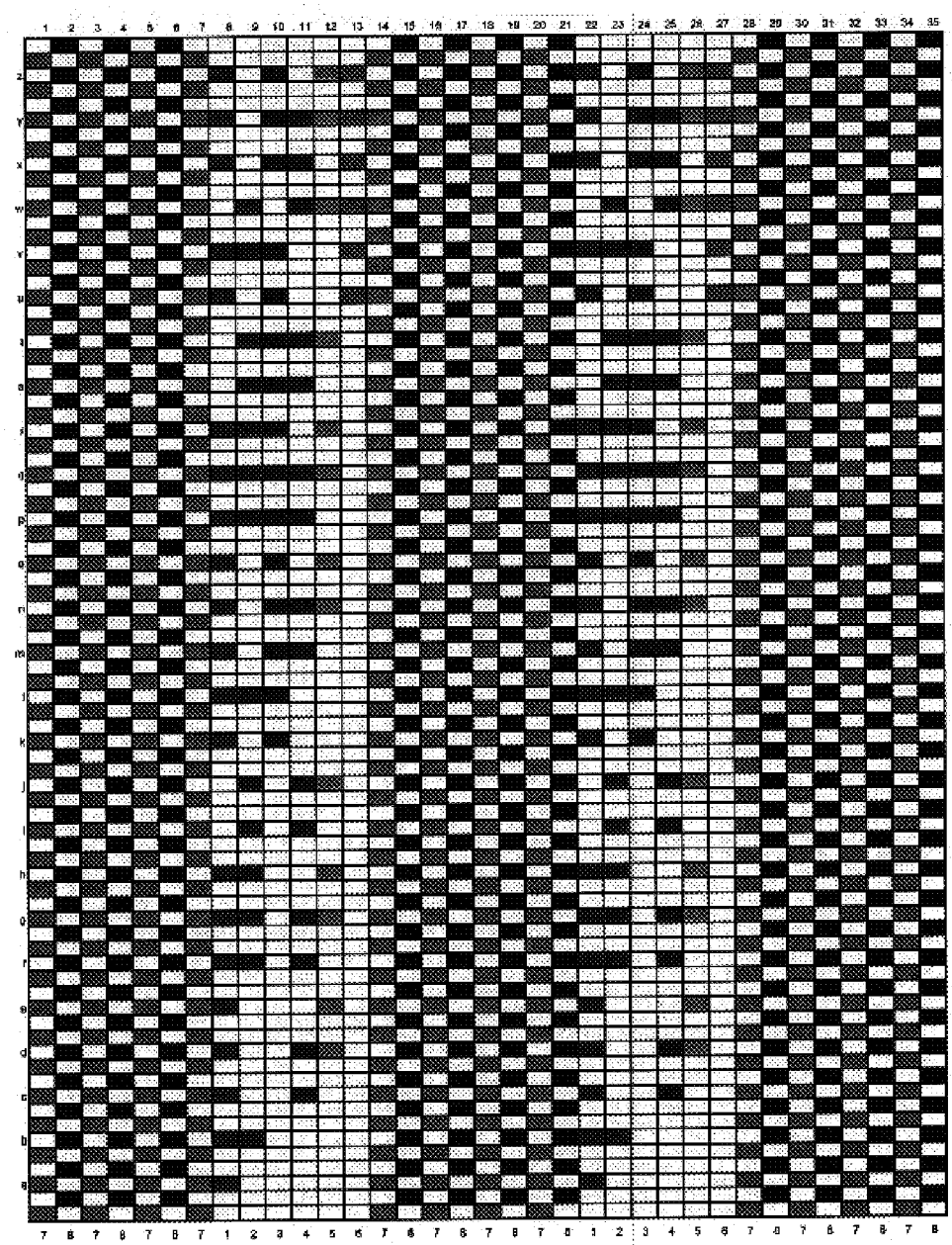
FIG. 21 is a schematic of a woven textile consistent with the invention using the stringing pattern of FIG. 13.

FIG. 21 uses the same stringing pattern and choice of weft thread color as FIG. 20. Like the woven textiles of FIGS. 16, 17, 18, 19, and 20, the woven textile of FIG. 21 has 26 reading content weft threads, and two filler weft threads woven in filler patterns before and after each reading content weft thread. The woven textile of FIG. 21 differs from that of FIG. 20 in that in addition to moving the appropriate Braille cell actuators when weaving a selected Braille cell, either non-Braille cell actuator 7 or non-Braille cell actuator 8 is also moved. Further, in this example, the filler patterns alternate such that which ever non-Braille cell actuator was moved along with a particular set of Braille cell actuators for weaving a selected Braille cell, the following adjacent filler weft thread will be woven by moving the other non-Braille cell actuator.

These modifications from the woven textile of FIG. 20 help make this particular example a tighter woven textile, because there is additional weaving of the warp and weft threads, locking all non-Braille threads on each woven weft thread, whether filler or reading content. However, if reading such a weaving by touch, the non-Braille warp threads woven over the reading content weft threads may make the woven Braille cells more difficult to read.

Figure 22:
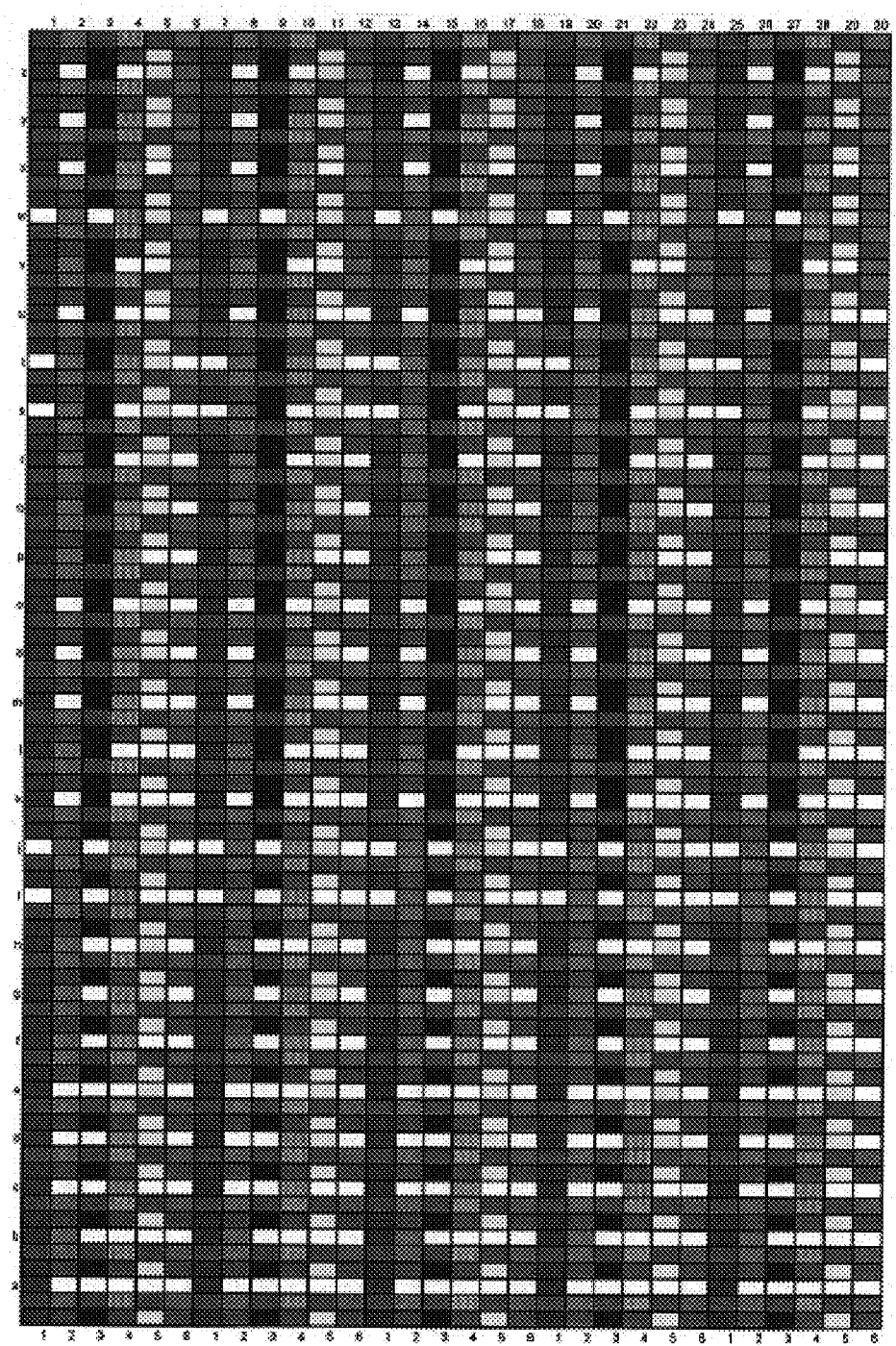
FIG. 22 is a schematic of a woven textile consistent with the invention using the stringing pattern of FIG. 14.

FIG. 22 is a schematic of a woven textile consistent with the invention, using the stringing pattern of FIG. 14. FIG. 22 is similar to FIG. 16, but without any of the warp threads that were connected to the first non-Braille actuator. Thus the two filler patterns illustrated in this example consist of an eighth filler pattern and a ninth filler pattern. In this example, the eighth filler pattern is accomplished by moving only the number 1, number 3 and number 5 Braille cell actuators, because there is no non-Braille cell actuator. In this example, the ninth filler pattern is accomplished by moving the number 2, number 4, and number 6 Braille cell actuators. While the actuators moved are the same as in FIG. 14, the ninth filler pattern differs from the second filler pattern due to the different stringing patterns.

Figure 23:
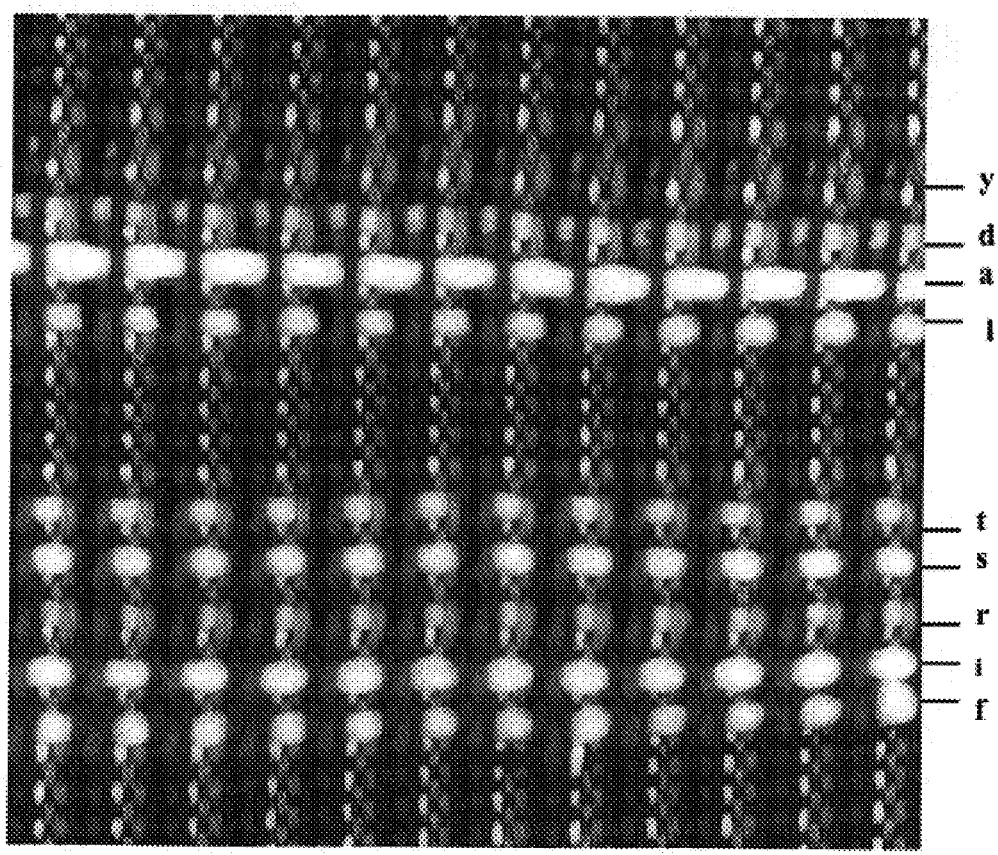
FIG. 23 is a photo of another woven textile consistent with the invention, encoding the words "first lady" and using the stringing pattern of FIG. 9.

FIG. 23 illustrates part of a woven textile using the stringing pattern of FIG. 9. In this example, the color selection for the warp threads in the stringing pattern is different. In this example, all warp thread connected to the number 1 Braille cell actuator are red. In this example, all warp threads connected to the number 2 Braille cell actuator are pink. In this example, all warp threads connected to the number 3 Braille cell actuator are dark blue. In this example, all warp threads connected to the number 4 Braille cell actuator are light blue. In this example, all warp threads connected to the number 5 Braille cell actuator are yellow. In this example, all warp threads connected to a number 6 Braille cell actuator are chartreuse. In this example, all warp threads connected to a first non-Braille cell actuator are white.

The warp threads used in the woven textile of FIG. 23 are all yarns sold by Debbie Bliss, Inc., and are made of 55% Merino wool, 33% microfibre, and 12% Cashmere. Such yarns may be purchased at craft stores, for example, Knit and Stitch in Bethseda, Md.

The woven textile of FIG. 23 has nine reading content weft threads all having a color very close to—almost indistinguishable from the color of the non-Braille cell warp threads. In this example, the reading content weft threads are two to three times as large as the filler weft threads and the warp threads. In this example the reading content weft thread is a white, hand-carded, Merino wool yarn from Rowan Big Wool, with a website at www.knitrowan.com. In this example, the filler weft threads are yarns from Debbie Bliss, as described above. In this example, the texture of the reading content weft threads is also different from the filler weft threads and the warp threads. As is illustrated, the first reading content weft thread is woven to represent the Braile cell "f." The second reading content weft thread is woven to represent the Braille cell "i." The third reading content weft thread is woven to represent the Braille cell "r." The fourth reading content weft thread is woven to represent the Braille cell "s." The fifth reading content weft thread is woven to represent the Braille cell "t." The first word woven is "first."

The sixth reading content weft thread is woven to represent the Braille cell "I." The seventh reading content weft thread is woven to represent the Braille cell "a." The eighth reading content weft thread is woven to represent the Braille cell "d." The ninth reading content weft thread is woven to represent the Braille cell "y." The second word woven is "lady."

In this example, the filler weft threads are woven in alternating tenth and eleventh filler patterns. The tenth filler pattern is accomplished by weaving Braille cell warp threads connected to the number 1, number 3, number 4, and number 6 Braille cell actuators over a filler weft thread. The eleventh filler pattern is accomplished by weaving Braille cell warp threads connected to the number 2 and number 5 Braille cell actuators, as well as non-Braille cell warp threads connected to the first non-Braille cell actuator over a filler weft thread. In this example, the color of the filler weft thread changes. In this example, several filler weft threads before the first reading content weft thread, the color of the filler weft threads is pine green. In this example, the color of the filler weft threads adjacent to the reading content weft threads is red, the same as the color of the warp threads connected to Braille cell actuator 1. The use of these two different filler weft thread colors demarcates where words begin and end.

Figure 24:
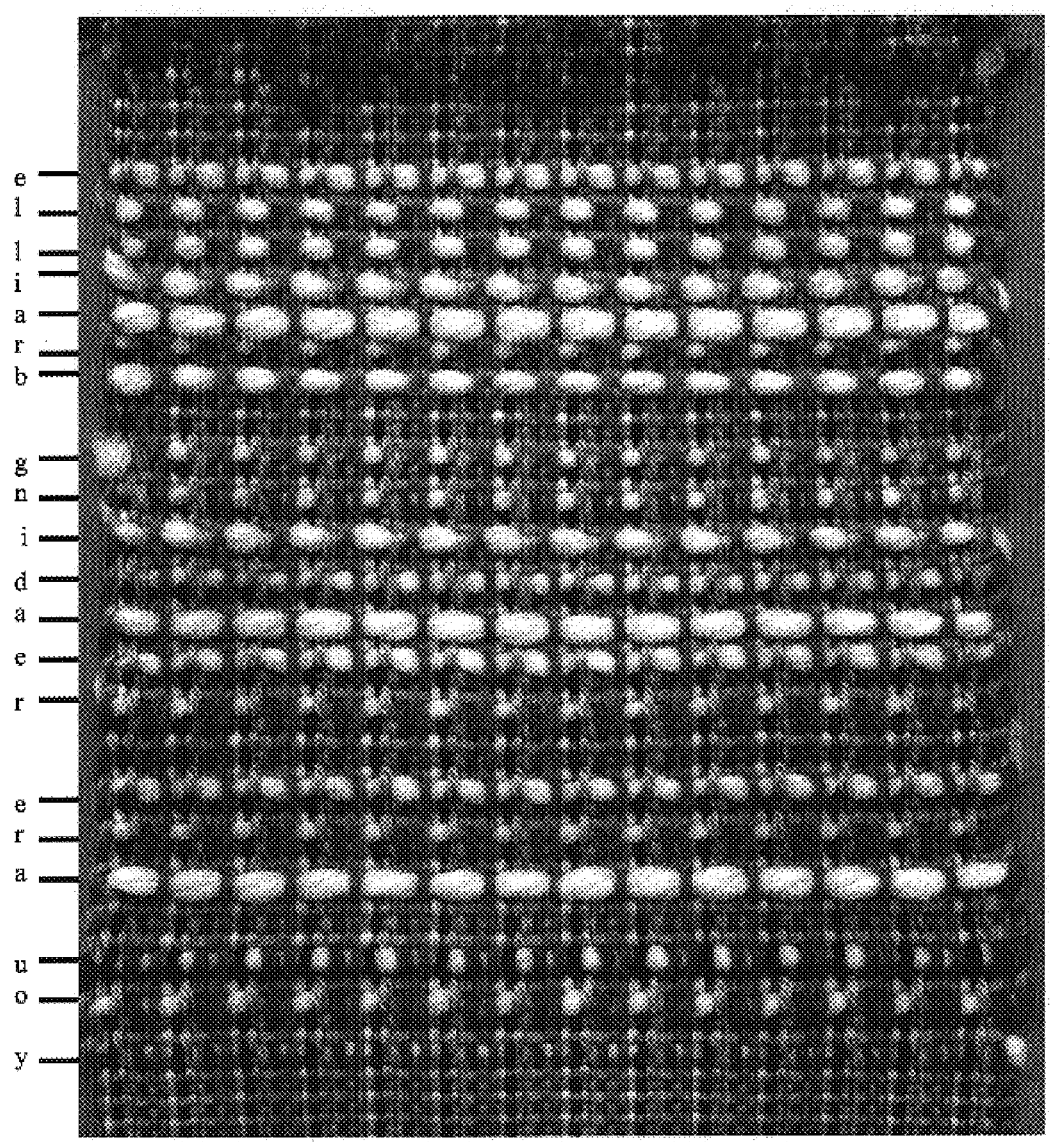
FIG. 24 is a photo of yet another woven textile consistent with the invention, encoding the words "you are reading braille" and using the stringing pattern of FIG. 9.

FIG. 24 illustrates part of another woven textile using the stringing pattern of FIG. 9. In this example, the color selection for the warp threads in the stringing pattern is different. In this example, all warp thread connected to the number 1 Braille cell actuator are red. In this example, all warp threads connected to the number 2 Braille cell actuator are orange. In this example, all warp threads connected to the number 3 Braille cell actuator are brown. In this example, all warp threads connected to the number 4 Braille cell actuator are mustard. In this example, all warp threads connected to the number 5 Braille cell actuator are light green. In this example, all warp threads connected to a number 6 Braille cell actuator are dark green. In this example, all warp threads connected to a first non-Braille cell actuator are white.

The warp threads used in the woven textile of FIG. 24 are all yarns sold by Debbie Bliss, Inc., and are made of 55% Merino wool, 33% microfibre, and 12% Cashmere, except the dark green warp thread. The dark green warp thread is from Plymouth Encore, in Bristol, Pa. and is identified as a knitting worsted weight yarn, made up of 75% acrylic and 25% wool, color 204. Such yarns may be purchased at craft stores, for example, Knit and Stitch in Bethseda, Md.

The woven textile of FIG. 24 has twenty reading content weft threads all having a color very close to—almost indistinguishable from the color of the non-Braille cell warp threads. In this example, the reading content weft threads are two to three times as large as the filler weft threads and the warp threads. In this example the reading content weft thread is a white, hand-carded, Merino wool yarn from Rowan Big. Wool, with a website at www.knitrowan.com. In this example, the filler weft threads are yarns from Debbie Bliss, as described above. In this example, the texture of the reading content weft threads is also different from the filler weft threads and the warp threads.

As is illustrated, the first reading content weft thread is woven to represent the Braille cell "y." In this example, the second reading content weft thread is woven to represent the Braille cell "o." In this example, the third reading content weft thread is woven to represent the Braille cell "u." The first word is "you."

In this example, the fourth reading content weft thread is woven to represent the Braille cell "a." In this example, the fifth reading content weft thread is woven to represent the Braille cell "r." In this example, the sixth reading content weft thread is woven to represent the Braille cell "e." The second word is "are."

In this example, the seventh reading content weft thread is woven to represent the Braille cell "r." In this example, the eighth reading content weft thread is woven to represent the Braille cell "e." In this example, the ninth reading content weft thread is woven to represent the Braille cell "a." In this example, the tenth reading content weft thread is woven to represent the Braille cell "d." In this example, the eleventh reading content weft thread is woven to represent the Braille cell "i." In this example, the twelfth reading content weft thread is woven to represent the Braille cell "n." In this example, the thirteenth reading content weft thread is woven to represent the Braille cell "g." The third word is "reading."

In this example, the fourteenth reading content weft thread is woven to represent the Braille cell "b." In this example, the fifteenth reading content weft thread is woven to represent the Braille cell "r." In this example, the sixteenth reading content weft thread is woven to represent the Braille cell "a." In this example, the seventeenth reading content weft thread is woven to represent the Braille cell "i." In this example, the eighteenth reading content weft thread is woven to represent the Braille cell "l." In this example, the nineteenth reading content weft thread is woven to represent the Braille cell "l." In this example, the twentieth reading content weft thread is woven to represent the Braille cell "e." The sixth word is "braille."

In this example, the filler pattern is the same as in FIG. 23.

Figure 25:
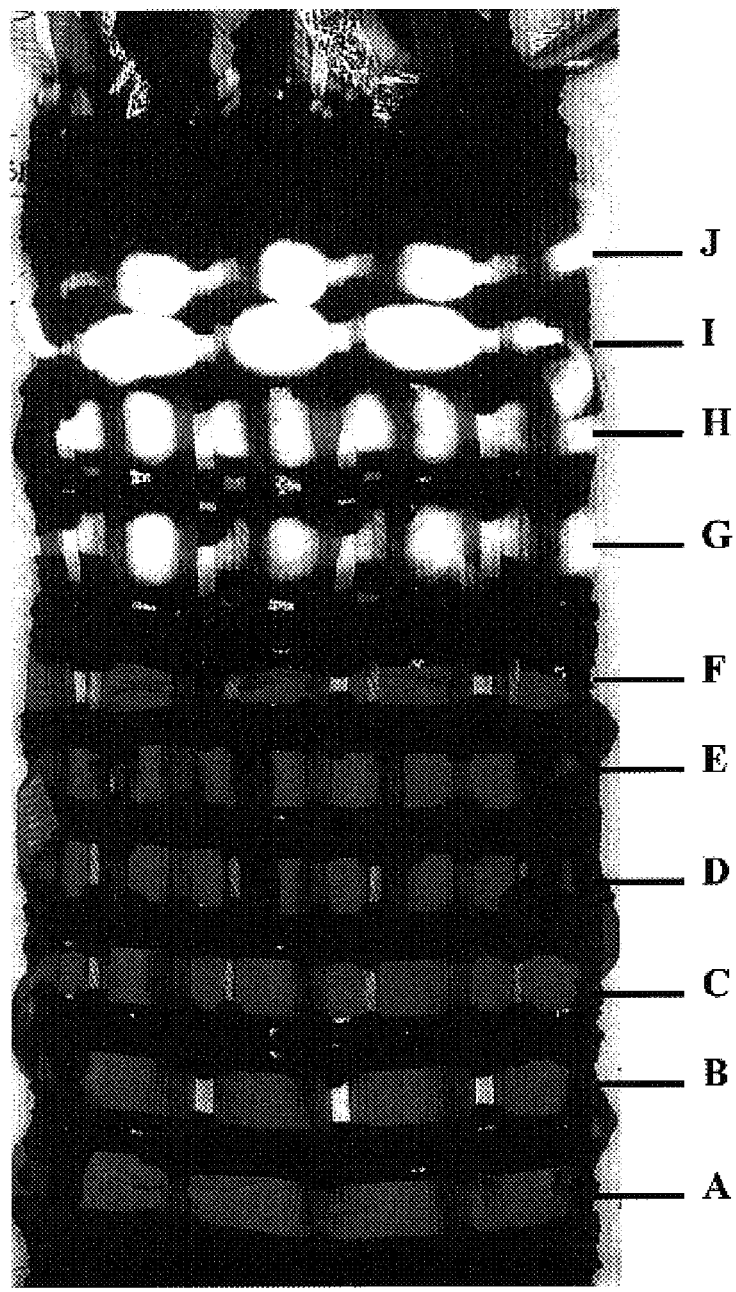
FIG. 25 is a photo of yet another woven textile consistent with the invention, encoding the letters a through j, with the selected Braille cell warp threads of FIG. 15.

FIG. 25 is a photo of another woven textile consistent with the invention. In FIG. 25, the Braille cells for the letters a through j are woven into the textile. The Braille cells warp threads are those illustrated in FIG. 15, strung in the pattern of FIG. 9. In this example, the non-Braille cell warp thread is a ¾" wide, black ribbon that compresses in width very easily. In this example, the black ribbon is also used for the filler weft threads. In this example, the reading weft threads for Braille cells a through f is a purple curling ribbon, like is used on many gift packages. In this example, the reading weft thread for Braille cells g through j is the Rowan Big Wool in white, as described above. In this example, the filler patterns alternate between the first and second filler patterns. Because of the selected weft thread expands over the woven filler weft threads adjacent, it appears to just be a large black band, accentuating the reading content weft threads.

Figure 26:
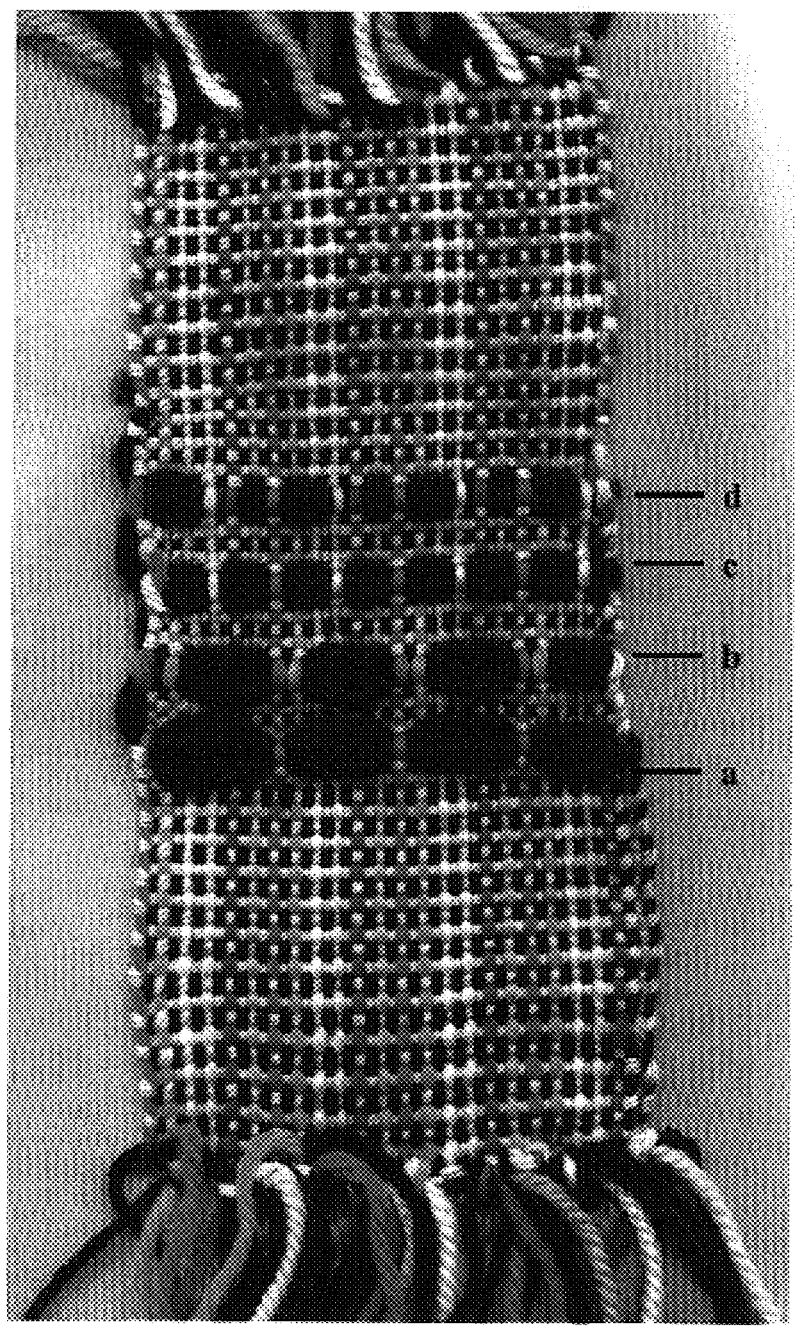
FIG. 26 is a photo of another woven textile consistent with the invention, using the stringing pattern of FIG. 11.

FIG. 26 is a photo of another woven textile consistent with the invention, using the stringing pattern of FIG. 11. In FIG. 26, the Braille cells for the letters a through d are woven into the textile and before and after each woven Braille cell are alternating filler patterns. In this example, the color selection for the warp threads in the stringing pattern is different than described for FIG. 11. In this example, all warp thread connected to the number 1 Braille cell actuator are hot pink. In this example, all warp threads connected to the number 2 Braille cell actuator are bright orange. In this example, all warp threads connected to the number 3 Braille cell actuator are light yellow. In this example, all warp threads connected to the number 4 Braille cell actuator are seafoam green. In this example, all warp threads connected to the number 5 Braille cell actuator are brilliant blue. In this example, all warp threads connected to a number 6 Braille cell actuator are lavender. In this example, all warp threads connected to a first non-Braille cell actuator are black.

In this example, the thread selected for the Braille cell warp threads are 100% acrylic, worsted knitting yarn, all having the same size and texture. In this example, the thread selected for the non-Braille cell warp threads is a black woven tubing, which has a different texture than the selected Braille cell warp threads.

In FIG. 16, the filler pattern alternates between a ninth filler pattern of just the first non-Braille cell actuator, which lifts every other warp thread, and a tenth filler pattern of number 1 through number 6 Braille cell actuators, which also lifts every other warp thread. The filler weft thread is a gray yarn of the same size and texture as the Braille warp threads, and the reading content weft thread is a black Rowan Big Wool yarn.

In general, the choice of color of the weft thread may assist or detract from a sighted person's ability to quickly determine which Braille cell warp threads representing the raised dots in the Braille cell are woven over the reading content weft thread. If the reading content weft thread is the same color as the Braille cell warp thread going over it, the presence of the Braille cell warp thread is much harder to detect by eye. Thus, the selection of a color for the reading content weft thread that is distinct and far apart from any of the selected colors for the Braille cell warp threads is also beneficial to assisting a reader. It is preferred that the color of the weft thread match the color of the warp threads connected to the lever acting as the "spacer" bar, or in other words, lever 7 or greater. It may be desired to select the relative color of the reading weft thread to be greatly different than filler weft threads.

In general, the relative size and texture of the weft threads versus the warp threads is one variable in determining the contrast present in a woven textile, and another variable is the relative size and texture of the "reading content" weft thread versus filler weft threads. It is beneficial to select the reading content weft thread to be larger and more textured than the adjacent weft threads, assuming there are filler weft threads between "reading" weft threads.

Figure 27:
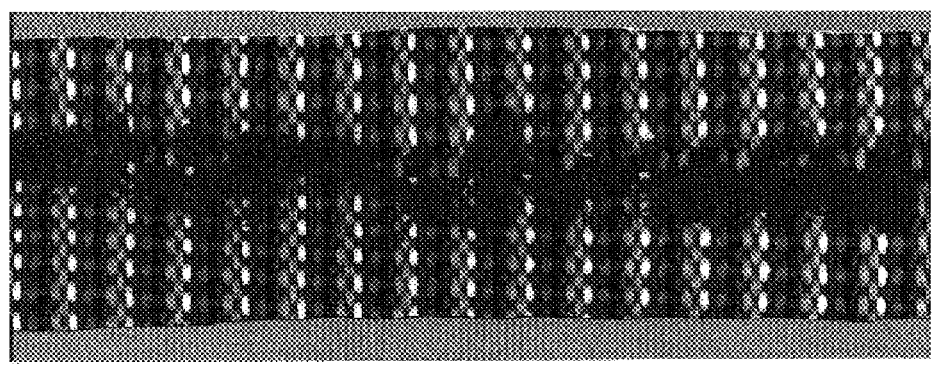
FIG. 27 is a photo of a woven textile including a "reading side" weft thread woven therein.

FIG. 27 illustrates a reading-side weft thread woven in a woven textile. In order to signal to someone deciphering a Braille weaving which "side" has the preferred pattern, one or more "fuzzy" weft threads may be woven with very few warp threads going over it, optionally with as few as will comfortably retain it within the weaving. This weft thread is called a "reading-side" weft thread. Then, by sight or feel, a "reader" may notice the side of the weaving that has most of the fuzzy thread exposed and then attempt to "read" the woven Braille on that side of the weaving.

Figure 28:
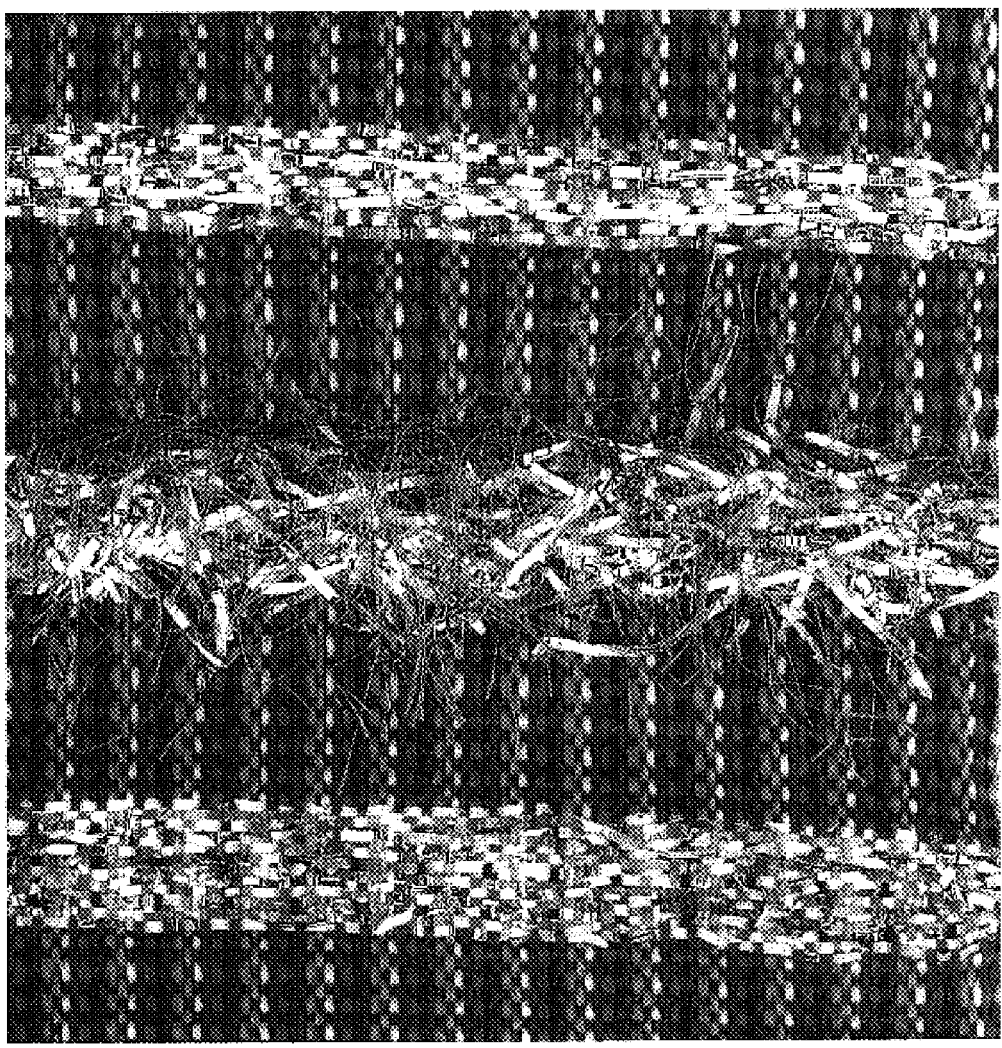
FIG. 28 is a photo of a woven textile using shredded money as weft thread using the stringing pattern of FIG. 9.

FIG. 28 illustrates a woven textile using shredded money as weft threads in three different sections. The stringing pattern of the woven textile of FIG. 28 is the same as in FIG. 24. In this example, new money from the Bureau of Engraving that has been shredded due to errors in manufacturing, or old money taken out of circulation by the Federal Reserve and then shredded, is woven in the tenth and eleventh filler patterns described in conjunction with FIG. 23. The shreds of money range in size from approximately ¼ inch to six inches in length and approximately ⅛ inch wide. A weaver may wish to perform a sorting process before weaving to select those shreds that are long enough to successfully stay in place in a desired weaving. In the method of stringing a loom to weave with shredded money, a weaver may arrange the threaded warp threads close enough together to prevent the shreds of money used as weft thread from falling out of the textile after being woven.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of stringing a loom, the loom having at least seven actuators: a number 1, number 2, number 3, number 4, number 5, and number 6 Braille cell actuators ordered to match the order of the six keys of a Perkins Brailler that create the raised dots of a Braille cell, and at least a first non-Braille cell actuator, each of the at least seven actuators connected to a separate harness, and each harness connected to at least one heddle, the method comprising:

threading at least a first thread through the at least one heddle connected to the number 1 Braille cell actuator, thereby creating a first number 1 Braille cell warp thread;

threading at least a second warp thread through the at least one heddle connected to the number 2 Braille cell actuator, thereby creating a first number 2 Braille cell warp thread;

threading at least a third thread through the at least one heddle connected to the number 3 Braille cell actuator, thereby creating a first number 3 Braille cell warp thread;

threading at least a fourth thread through the at least one heddle connected to the number 4 Braille cell actuator, thereby creating a first number 4 Braille cell warp thread;

threading at least a fifth thread through the at least one heddle connected to the number 5 Braille cell actuator, thereby creating a first number 5 Braille cell warp thread;

threading at least a sixth thread through the at least one heddle connected to the number 6 Braille cell actuator, thereby creating a first number 6 Braille cell warp thread; and threading a seventh thread through a heddle connected to the first non-Braille cell actuator, thereby creating the first non-Braille cell warp thread, and wherein each of the first number 1 through number 6 Braille cell warp threads has a different color and the first number 1 through number 6 Braille cell warp threads are disposed in numerical order from left to right on the loom and as consecutive warp threads, and the first non-Braille cell warp thread is disposed to the right of and adjacent to the first number 6 Braille cell warp thread; and threading at least seven additional warp threads, such that the number 1 Braille cell actuator, when moved, separates the first number 1 Braille cell warp thread, and at least one of the at least seven additional warp threads a whole multiple of seven away from the first number 1 Braille cell warp thread, from the remainder of the warp threads;

the number 2 Braille cell actuator, when moved, separates the first number 2 Braille cell warn thread, and at least one of the at least seven additional warp threads a whole multiple of seven away from the first number 2 Braille cell warp thread, from the remainder of the warn threads;

the number 3 Braille cell actuator, when moved, separates the first number 3 Braille cell warp thread, and at least one of the at least seven additional warp threads a whole multiple of seven away from the first number 3 Braille cell warp thread, from the remainder of the warn threads;

the number 4 Braille cell actuator, when moved, separates the first number 4 Braille cell warp thread and at least one of the at least seven additional warp threads, a whole multiple of seven away from the first number 4 Braille cell warp thread, from the remainder of the warp threads;

the number 5 Braille cell actuator, when moved, separates the first number 5 Braille cell warn thread, and at least one of the at least seven additional warp threads a whole multiple of seven away from the first number 5 Braille cell warn thread, from the remainder of the warn threads;

the number 6 Braille cell actuator, when moved, separates the first number 6 Braille cell warn thread, and at least one of the at least seven additional warp threads a whole multiple of seven away from the first number 6 Braille cell warp thread, from the remainder of the warp threads; and the first non-Braille cell actuator, when moved, separates the first non-Braille cell warp thread, and at least one of the at least seven additional warp threads a whole multiple of seven away from the first non-Braille cell warp thread, from the remainder of the warn threads.

2. A method of weaving Braille on a loom, the loom having at least seven actuators: a number 1, number 2, number 3, number 4, number 5, and number 6 Braille cell actuators and at least a first non-Braille cell actuator, each of the at least seven actuators connected to a separate harness, and each harness connected to at least one heddle, whereby when an actuator is moved, the at least one heddle moves apart from the heddles connected to the actuators that are not moved, the method comprising:

stringing the loom, the stringing step comprising:
threading at least a first thread through the at least one heddle connected to the number 1 Braille cell actuator, thereby creating a first number 1 Braille cell warp thread;

threading at least a second warp thread through the at least one heddle connected to the number 2 Braille cell actuator, thereby creating a first number 2 Braille cell warp thread;

threading at least a third thread through the at least one heddle connected to the number 3 Braille cell actuator, thereby creating a first number 3 Braille cell warp thread;

threading at least a fourth thread through the at least one heddle connected to the number 4 Braille cell actuator, thereby creating a first number 4 Braille cell warp thread;

threading at least a fifth thread through the at least one heddle connected to the number 5 Braille cell actuator, thereby creating a first number 5 Braille cell warp thread;

threading at least a sixth thread through the at least one heddle connected to the number 6 Braille cell actuator, thereby creating a first number 6 Braille cell warp thread;

threading at least seventh thread through at least one heddle connected to the first non-Braille cell actuator;

wherein each of the first number 1 through number 6 Braille cell warp threads and the first non-Braille cell warp thread is a different color;

weaving at least one selected Braille cell having raised dots, the Braille cell weaving step comprising:
moving the one or more of the number 1 through number 6 Braille cell actuators, which correspond to the raised dots of the selected Braille cell, thereby creating a shed between the warp threads that are connected to the one or more moved Braille cell actuators and the remainder of the warp threads on the loom; and passing a reading content weft thread through the shed, thereby creating a woven Braille cell consisting of the reading content weft thread with one or more warp threads corresponding to the moved Braille cell actuators on top;

wherein the woven Braille cell may be more quickly determined by a sighted Person by identifying the colors of the warn threads on top of the reading content weft thread than identifying the position of those same warp threads with respect to the first number 1 Braille cell warp thread.

3. A method of weaving Braille on a loom, the loom having at least seven actuators: a number 1, number 2, number 3, number 4, number 5, and number 6 Braille cell actuators and at least a first non-Braille cell actuator, each of the at least seven actuators connected to a separate harness, and each harness connected to at least one heddle, whereby when an actuator is moved, the at least one heddle moves apart from the heddles connected to the actuators that are not moved, the method comprising:

stringing the loom, the stringing step comprising:
threading at least a first thread through the at least one heddle connected to the number 1 Braille cell actuator, thereby creating a first number 1 Braille cell warp thread;

threading at least a second warn thread through the at least one heddle connected to the number 2 Braille cell actuator, thereby creating a first number 2 Braille cell warp thread;

threading at least a third thread through the at least one heddle connected to the number 3 Braille cell actuator, thereby creating a first number 3 Braille cell warp thread;

threading at least a fourth thread through the at least one heddle connected to the number 4 Braille cell actuator, thereby creating a first number 4 Braille cell warp thread;

threading at least a fifth thread through the at least one heddle connected to the number 5 Braille cell actuator, thereby creating a first number 5 Braille cell warn thread;

threading at least a sixth thread through the at least one heddle connected to the number 6 Braille cell actuator, thereby creating a first number 6 Braille cell warp thread;

threading at least seventh thread through at least one heddle connected to the first non-Braille cell actuator;

wherein each of the first number 1 through number 6 Braille cell warn threads and the first non-Braille cell warn thread is a different color:

weaving at least one selected Braille cell having raised dots, the Braille cell weaving step comprising:

moving the one or more of the number 1 through number 6 Braille cell actuators, which correspond to the raised dots of the selected Braille cell, thereby creating a shed between the warn threads that are connected to the one or more moved Braille cell actuators and the remainder of the warp threads on the loom; and passing a reading content weft thread through the shed; and weaving a filler weft thread in a filler pattern at least once before weaving the selected Braille cell.

4. The method of claim 3, wherein the first number 1 through number 6 Braille cell warp threads are arranged side by side in numerical order, and the reading content weft thread has a different texture than the first number 1 through number 6 Braille cell warp threads.

5. The method of claim 3 further comprising:
weaving a reading-side weft thread having a "fuzzy" texture under as few warp threads as possible, exposing much of the surface of the reading-side weft thread to touch and view.

6. The method of claim 3, wherein the first number 1 Braille cell warp thread is red, the first number 2 Braille cell warp thread is pink, the first number 3 Braille cell warp thread is dark blue, the first number 4 Braille cell warp thread is light blue, the first number 5 Braille cell warp thread is yellow, the first number 6 Braille cell warp thread is chartreuse, and the first non-Braille cell warp thread is white.

7. The method of claim 3, wherein the first number 1 through number 6 Braille cell warp threads are arranged side by side in numerical order, and the color of the "reading content" weft thread is virtually indistinguishable from the color of the first non-Braille cell warp thread.

8. The method of claim 3, wherein weaving the filler pattern comprises moving the number 1, number 3, number 4, and number 6 Braille cell actuators thereby creating a shed between the first number 1, number 3, number 4, and number 6 Braille cell warp threads and the remaining warp threads; and passing a filler weft thread through the shed.

9. The method of claim 3, wherein weaving the filler pattern comprises moving the number 2 and number 5 Braille cell actuators and the first non-Braille cell actuator thereby creating a shed between the first number 2 and first number 5 Braille cell warp threads and the first non-Braille cell warp thread and the remaining warp threads; and passing a filler weft thread through the shed.

10. The method of claim 3, wherein weaving the filler pattern comprises moving only the first non-Braille cell actuator, thereby creating a shed between the first non-Braille cell warp thread and the remaining warp threads; and passing a filler weft thread through the shed.

11. The method of claim 3, wherein the reading content weft thread has a different texture, size, and color than at least the filler weft thread adjacent to it.

12. A woven textile comprising:
a first warp thread having a color, size, and texture;
a second warp thread having a different color than the first warp thread;
a third warp thread having a different color than the first or second warp thread;
a fourth warp thread having a different color than the first, second, or third warp thread;
a fifth warp thread having a different color than the first, second, third, or fourth warp thread;
a sixth warp thread having a different color than the first, second, third, fourth, or fifth warp thread,
a seventh warp thread, wherein the first through seventh warp threads are arranged from left to right; and
a reading content weft thread under a first subset of the first through sixth warp threads and over the seventh warp thread, wherein the first through sixth warp threads represent the first through sixth possible raised dots in a Braille cells, respectively, and the first subset of first through sixth warp threads represents a known Braille cell.

13. The woven textile of claim 12, further comprising:
a first filler weft thread adjacent to the reading content weft thread.

14. The woven textile of claim 13, wherein the first filler weft thread is woven in a filler pattern chosen from the set consisting of: under the second, fifth and seventh warp threads and under the first, third, fourth, and sixth warp threads.

15. The woven textile of claim 13, further comprising:
a second filler weft thread adjacent to at least one of the following weft threads: the reading content weft thread or the first filler weft thread, wherein the first and second filler weft threads are woven in different filler patterns.

16. The woven textile of claim 12, wherein the reading content weft thread has the same color as the seventh warp thread.

17. The woven textile of claim 12, wherein the reading content weft thread has a different texture than the first through sixth warp threads.

* * * * *

UNITED STATES PATENT AND TRADEMARK OFFICE
CERTIFICATE OF CORRECTION

PATENT NO.       : 7,134,457 B2
APPLICATION NO.  : 11/073162
DATED            : November 14, 2006
INVENTOR(S)      : Jennifer J. Mayster It is certified that error appears in the above-identified patent and that said Letters Patent is hereby corrected as shown below:

Claim 1, col. 21, lines 25, 28, 34, 42, 46, 49, and 58, "warn" should read --warp--.

Claim 2, col. 22, line 49, "Person" should read --person--.

Claim 3, col. 23, lines 1, 16, 25, and 32, "warn" should read --warp--.

Signed and Sealed this

Thirtieth Day of January, 2007

JON W. DUDAS
*Director of the United States Patent and Trademark Office*